US012760433B2

(12) United States Patent
Mishra et al.

(10) Patent No.: US 12,760,433 B2

(45) Date of Patent: Oct. 13, 2026

(54) TWO-DIMENSIONAL HIGH-ENTROPY TRANSITION METAL DICHALCOGENIDES FOR CARBON DIOXIDE ELECTROCATALYSIS

(71) Applicants: Washington University, St. Louis, MO (US); THE BOARD OF TRUSTEES OF THE UNIVERSITY OF ILLINOIS, Urbana, IL (US)

(72) Inventors: Rohan Mishra, St. Louis, MO (US); John Cavin, St. Louis, MO (US); Amin Salehi-Khojin, Urbana, IL (US)

(73) Assignees: Washington University, St. Louis, MO (US); Board of Trustees of the University of Illinois, Urbana, IL (US)

( * ) Notice: Subject to any disclaimer, the term of this patent is extended or adjusted under 35 U.S.C. 154(b) by 1096 days.

(21) Appl. No.: 17/835,617

(22) Filed: Jun. 8, 2022

(65) Prior Publication Data

US 2022/0389600 A1 Dec. 8, 2022

Related U.S. Application Data

(60) Provisional application No. 63/192,955, filed on May 25, 2021.

(51) Int. Cl.

| | |
|---|---|
| ***C25B 11/089*** | (2021.01) |
| ***B01J 27/02*** | (2006.01) |
| ***C25B 1/23*** | (2021.01) |
| ***C25B 1/50*** | (2021.01) |

(52) U.S. Cl.

CPC ............. *C25B 11/089* (2021.01); *B01J 27/02* (2013.01); *C25B 1/23* (2021.01); *C25B 1/50* (2021.01)

(58) Field of Classification Search

CPC .......... C25B 11/089; C25B 1/23; C25B 1/50; C25B 1/27; C25B 11/032; C25B 11/075; B01J 27/02

See application file for complete search history.

(56) References Cited

U.S. PATENT DOCUMENTS

| | | | | |
|---|---|---|---|---|
| 2016/0145752 | A1* | 5/2016 | Salehi | C25B 1/02 205/555 |
| 2019/0039913 | A1* | 2/2019 | Balema | C01B 19/002 |
| 2020/0109479 | A1* | 4/2020 | Balema | C25B 11/075 |
| 2022/0320487 | A1* | 10/2022 | Choi | H01M 10/0562 |
| 2023/0395742 | A1* | 12/2023 | Heo | H10F 71/00 |

OTHER PUBLICATIONS

Hlova et al., Multi-principal element transition metal dichalcogenides via reactive fusion of 3D-heterostructures, Chem. Commun., 2018, vol. 54, pp. 12574-12577.

Wang et al., High-Throughput Computational Characterization of 2D Compositionally Complex Transition-Metal Chalcogenide Alloys, Advanced Theory and Simulations, 2020, vol. 3, No. 11. 2000195.

* cited by examiner

*Primary Examiner* — Bryan D. Ripa

(57) ABSTRACT

Two-dimensional (2D) high-entropy transition metal dichalcogenide (TMDC) alloy compositions, methods of synthesizing the TMDC alloys, physical/chemical properties of the TMDC alloys, and uses of the TMDC alloys as catalysts in electrochemical reactions are disclosed.

6 Claims, 30 Drawing Sheets

TWO-DIMENSIONAL HIGH-ENTROPY TRANSITION METAL DICHALCOGENIDES FOR CARBON DIOXIDE ELECTROCATALYSIS

CROSS-REFERENCE TO RELATED APPLICATIONS

This application claims priority from U.S. Provisional Application Ser. No. 63/192,955 filed on May 25, 2021, which is incorporated herein by reference in its entirety.

STATEMENT REGARDING FEDERALLY SPONSORED RESEARCH OR DEVELOPMENT

This invention was made with government support under CBET1729420, CBET1800357, CBET1729787, and DMI1806147 awarded by the National Science Foundation. The government has certain rights in the invention.

MATERIAL INCORPORATED-BY-REFERENCE

Not applicable.

FIELD OF THE DISCLOSURE

The present disclosure generally relates to alloy compositions, methods of producing the alloy compositions, and methods of using the alloy compositions. In particular, the present disclosure describes two-dimensional (2D) high-entropy transition metal dichalcogenide (TMDC) alloy compositions, methods of synthesizing the TMDC alloys, and physical/chemical properties of the TMDC alloys.

BACKGROUND OF THE DISCLOSURE

High entropy alloys (HEAs) combine multiple principal elements at a near equal fraction. They present a vast compositional space to achieve outstanding functionalities that are not present in traditional alloys having only one or two principal elements.

A vast compositional space of transition metal dichalcogenide (TMDC) alloys with potentially exciting properties has remained largely unexplored due to the lack of a comprehensive stability map to accommodate different cations or chalcogens in a single phase—that is, to form single-phase solid solutions.

Quasi-binary alloying among pairs of 2-dimensional (2D) transition metal dichalcogenides (TMDCs) is an attractive method for tuning material properties for applications such as optoelectronics and catalysis. Of the many possible combinations of TMDCs, a small subset of semiconducting alloys has garnered widespread attention. Outside this limited subset, the synthesizability of alloys remains largely unknown.

Other objects and features will be in part apparent and in part pointed out hereinafter.

SUMMARY

In one aspect, a high-entropy alloy composition that includes at least four different transition metals from groups V and VI of the periodic table alloyed on a cation sublattice is disclosed. The composition includes a two-dimensional (2D) high-entropy transition metal dichalcogenide (TMDC). In some aspects, the composition includes one of: $(M^{(1)}M^{(2)}M^{(3)}M^{(4)})_{0.25}(X)_2$, and $(M^{(1)}M^{(2)}M^{(3)}M^{(4)}M^{(5)})_{0.20}X_2$; $M^{(1)}$, $M^{(2)}$, $M^{(3)}$, $M^{(4)}$, and $M^{(5)}$ are independently selected from the group consisting of V, Nb, Ta, Mo, and W, and X is selected from the group consisting of S and Se. In some aspects, the composition is miscible, and composition includes one of $(MoWNbV)_{0.25}S_2$, $(MoWNbTa)_{0.25}S_2$, $(MoWVNbTa)_{0.20}S_2$, and $(MoVNbTa)_{0.25}S_2$.

In another aspect, a catalyst composition that includes at least four different transition metals from groups V and VI of the periodic table alloyed on a cation sublattice is disclosed. The catalyst composition includes a two-dimensional (2D) high-entropy transition metal dichalcogenide (TMDC) alloy. In some aspects, the catalyst composition includes one of: $(M^{(1)}M^{(2)}M^{(3)}M^{(4)})_{0.25}(X)_2$, and $(m^{(1)}M^{(2)}M^{(3)}M^{(4)}M^{(5)})_{0.20}X_2$, $M^{(1)}$, $M^{(2)}$, $M^{(3)}$, $M^{(4)}$, and $M^{(5)}$ are independently selected from the group consisting of V, Nb, Ta, Mo, and W, and X is selected from the group consisting of S and Se. In some aspects, the catalyst composition is miscible and includes one of $(MoWNbV)_{0.25}S_2$, $(MoWNbTa)_{0.25}S_2$, $(MoWVNbTa)_{0.20}S_2$, and $(MoVNbTa)_{0.25}S_2$. In some aspects, the catalyst composition is configured to catalyze an electrochemical reaction; the electrochemical reaction includes one of $CO_2$ reduction to CO, $O_2$ reduction, $H_2$ reduction, and $N_2$ reduction to $NH_3$. In some embodiments, the catalyst composition is configured to catalyze the electrochemical reaction including the $CO_2$ reduction to CO, wherein the catalyst composition includes $(MoWVNbTa)_{0.20}S_2$.

In another additional aspect, a method of $CO_2$ electroreduction to CO is disclosed that includes contacting an amount of $CO_2$ to a catalyst composition to reduce the amount of $CO_2$ to an amount of CO. The catalyst composition includes $(MoWVNbTa)_{0.20}S_2$. In some aspects, the catalyst composition further includes a current density of about 0.51 $A/cm^2$ at about −0.8 V vs. RHE. In some embodiments, the catalyst composition further includes a one-hour turnover number of about $\sim 2.1\times10^5$ at about −0.8 V vs. RHE. In some embodiments, the catalyst composition further includes a turnover frequency of about 58.30 $s^{-1}$ at about −0.8 V vs. RHE. In some embodiments, the catalyst composition further includes an energy consumption of 0.08 $kWhmol^{-1}$ at about 1.55 V cell potential and 0.1 kWh $mol^{-1}$ at about 2.17 V cell potential. In some embodiments, the catalyst composition further includes an energy efficiency ranging from about 90% to about 75.3% during operation at cell potentials ranging from about 1.55 V to about 2.17 V.

Other aspects of the disclosed high-entropy alloy compositions, catalyst compositions, and methods of catalyzing electrochemical reactions using the catalyst compositions are provided herein.

DESCRIPTION OF THE DRAWINGS

Those of skill in the art will understand that the drawings, described below, are for illustrative purposes only. The drawings are not intended to limit the scope of the present teachings in any way.

As shown in FIG. 12, this could be due to hydrogen evolution reaction (HER) or the production of other products such as methane ($CH_4$) or formate (HCOOH). The FE of CO for Ag NPs drops significantly from −0.52 V to −0.76 V vs RHE.

Figure 1A:
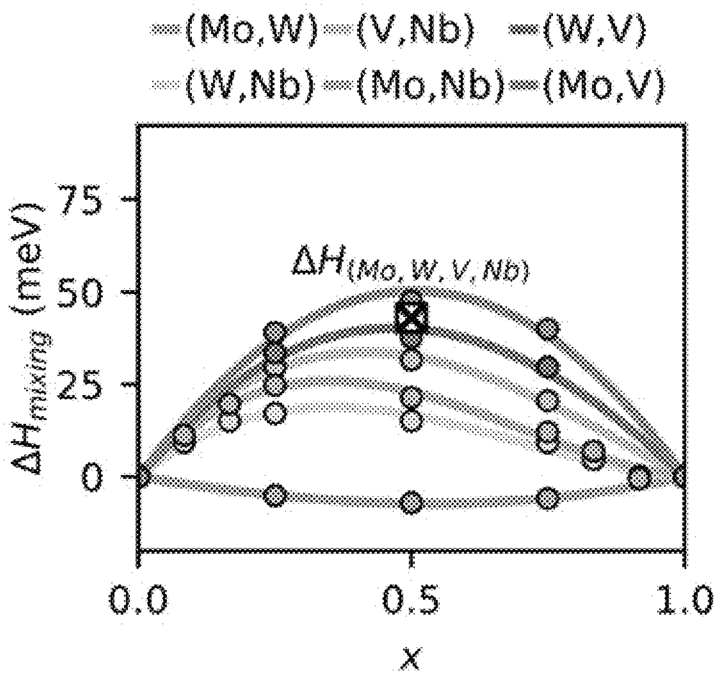
FIG. 1A is a graph of the mixing enthalpies for the 6 possible pairwise binary alloys corresponding to (Mo,W,V, Nb) with the boxed x representing the equimolar HEA enthalpy.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE INVENTION

In various aspects, new and stable transition metal dichalcogenide (TMDC) alloy compositions and methods of synthesis are disclosed herein. In some aspects, some TMDC alloys show extraordinary properties as electrocatalysts for $CO_2$ reduction and Li-air batteries. The TMDC alloys are also thermally very stable. The synthesis of the TMDC alloys and the evaluation of their properties is also described herein.

In various aspects, a new class of two-dimensional materials, high-entropy transition metal dichalcogenide alloys, are disclosed herein. In some aspects, the disclosed TMDC HEAs show exceptional catalytic activity for electrochemical reactions. As illustrated in the Examples below, the disclosed TMDC HEAs exhibit enhanced performance relative to existing catalyst compositions and can be produced using a scalable method. Furthermore, this disclosed TMDC HEAs are suitable for use as catalysts in other electrochemical reactions including, but not limited to, $CO_2$ reduction to CO, $O_2$ reduction, $H_2$ reduction, and $N_2$ reduction to $NH_3$.

In various other aspects, the synthesis of layered high-entropy transition metal disulfides involving alloying of 4-5 transition metals from groups IV and V of the periodic table is disclosed. As described in the Examples below, the relative stability of these high-entropy transition metal dichalcogenides (TMDCs) was quantified using density-functional-theory (DFT) calculations of formation enthalpy, and combined with the change in configurational entropy upon alloying to estimate the growth temperature above which the HEA is stable against decomposition. Four alloys, $(MOWNbV)_{0.25}S_2$, $(MoWNbTa)_{0.25}S_2$, $(MoWVNbTa)_{0.20}S_2$, and $(MoVNbTa)_{0.25}S_2$, were predicted to be stable at relatively low growth temperatures. As described in the Examples below, the first three of these alloys with approximately equimolar stoichiometries were synthesized, and the $(MoWVNbTa)_{0.20}S_2$ structure demonstrated an exceptionally high electrocatalytic performance for $CO_2$ conversion.

As disclosed in the Examples below, equilibrium temperature-composition phase diagrams were generated using first-principles calculations to identify the regions of stability for the quasi-binary TMDC alloys, including those involving non-isovalent cations. The synthesis of a subset of the predicted alloys was disclosed herein by way of experimental verification. The disclosed alloys can be exfoliated into 2D structures, and some alloys exhibit outstanding thermal stability as tested up to 1230 K.

In various aspects, the disclosed quasi-binary TMDC alloys comprise equimolar HEAs of Mo, W, V, Nb, and Ta sulfides. In some aspects, the quasi-binary TMDC alloys have a positive mixing enthalpy and are, hence, immiscible at lower temperatures. However, in various aspects, the immiscible quasi-binary TMDC alloys may be stabilized in single-phase solid solutions by growing the alloys at higher temperatures where the configurational entropy, which favors miscibility, dominates the contribution to the Gibbs free energy (ΔG). As used herein, miscibility temperature $T_{misc}$ refers to the minimum growth temperature above which the alloy is miscible. $T_{misc}$ may be determined using any suitable method including, but not limited to, first-principles methods as described in the Examples below.

In various aspects, the 2D high-entropy TMDC alloys described herein provide a materials platform to design high-performance catalysts for a wide range of electrochemical systems. As described in the Examples below, the synthesis, structure, and catalytic performance of the TMDC alloys are assessed using computational prediction, synthesis, and multiscale characterization of the two-dimensional (2D) high-entropy transition metal dichalcogenides (TMDCs), including four- and five-transition metals from groups V and VI of the periodic table alloyed on the cation sublattice. The electrochemical performance of $(MoWVNbTa)_{0.20}S_2$ for $CO_2$ conversion to CO was assessed and exhibited a current density of 0.51 $A/cm^2$ at −0.8 V vs. RHE, a turnover number (in one hour) of approximately ~$2.1\times10^5$, and a turnover frequency of 58.30 $s^{-1}$ at a similar potential. The energy consumption for CO production changed from 0.08 $kWhmol^{-1}$ at 1.55 V cell potential with a gradual increase up to 0.1 kWh $mol^{-1}$ at 2.17 V. At this potential range, energy efficiency values varied between ~90% and 75.3%. First-principles calculations revealed that the superior $CO_2$ electroreduction of the high-entropy TMDC alloy was a direct consequence of its large configurational disorder that leads to an overall drop in the energy barrier of the rate-limiting step involving CO desorption. Specifically, the reaction intermediates were found to hop from one site to a neighboring site having a more optimized binding energy leading to an increased turnover frequency of CO formation.

The compositions and methods disclosed herein provide a platform for the development of materials involving 2D high entropy TMDC alloys, including computational predictions of alloy stability and performance, as well as methods of alloy synthesis and characterization. The HEA with the highest configurational entropy, $(MoWVNbTa)_{0.2}S_2$, was tested for $CO_2$ electroreduction. This catalyst exhibited extremely high activity with high selectivity towards CO production at low overpotentials. Without being limited to any particular theory, the high catalytic activity of the tested HEA ($(MoWVNbTa)_{0.2}S_2$) is attributed to the ease of CO desorption through hopping to neighboring sites with lower binding energies. Owing to these excellent properties, we anticipate high entropy TMDC alloys to have high activity for other core electrocatalytic reactions and open a new pathway for advances in electrochemical energy systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

EXAMPLES

The following examples illustrate various aspects of the disclosure.

Example 1: Two Dimensional High-Entropy Transition Metal Dichalcogenides for Carbon Dioxide Electrocatalysis High entropy alloys (HEAs) combine multiple principal elements at a near equal fraction. They present a vast compositional space to achieve outstanding functionalities that are not present in traditional alloys having only one or two principal elements. The prediction, synthesis and multiscale characterization of two-dimensional (2D) high-entropy transition metal dichalcogenides (TMDCs) involving four- and five-transition metals from groups V and VI of the periodic table alloyed on the cation sublattice is reported. In particular, the electrochemical performance of $(MoWVNbTa)_{0.20}S_2$ for $CO_2$ conversion to CO was studied and achieved a record current density of 0.51 $A/cm_2$ at −0.8 V vs. RHE, a turnover number (in one hour) of approximately ~$2.1\times10_5$, and a turnover frequency of 58.30 $s_{-1}$ at a similar potential. The energy consumption for CO production is found to change from 0.08 kWh $mol_{-1}$ at 1.55 V cell potential with a gradual increase up to 0.1 kWh $mol_{-1}$ at 2.17 V. At this potential range, energy efficiency values vary between ~90% and 75.3%. First-principles calculations reveal that the superior $CO_2$ electroreduction of the high-entropy TMDC alloy is a direct consequence of its large configurational disorder that leads to an overall drop in the energy barrier of the rate-limiting step involving CO desorption. Specifically, reaction intermediates can hop from one site to a neighboring site having a more optimized binding energy leading to an increased turnover frequency of CO formation. 2D high-entropy TMDC alloys provide a materials platform to design superior catalysts for a wide range of electrochemical systems.

The incorporation of many principal elements into the so-called high entropy alloys (HEAs) has generated significant interest since their first report in 2004. As opposed to traditional multi-component alloys, which include one or two principal elements with others at lower fractions, HEAs contain multiple elements at a near equimolar fraction. They provide a vast combinatorial space for the design of new materials with outstanding functionalities that remains largely unexplored. More recently, the field of HEAs has been expanding beyond metal alloys to include metal-oxides, nitrides, carbides, borides, and silicides to achieve superior mechanical properties. However, reports on two-dimensional (2D) HEAs that can blend the combinatorial properties of HEAs with the attractive physical properties of 2D materials, such as their large surface area, are missing.

In various aspects, the synthesis of layered high-entropy transition metal disulfides involving alloying of 4-5 transition metals from groups IV and V of the periodic table is disclosed. The relative stability of these high-entropy transition metal dichalcogenides (TMDCs) was quantified using density-functional-theory (DFT) calculations of formation enthalpy and combined with the change in configurational entropy upon alloying to estimate the growth temperature above which the HEA is stable against decomposition. Four alloys, $(MoWNbV)_{0.25}S_2$, $(MoWNbTa)_{0.25}S_2$, $(MoWVNbTa)_{0.20}S_2$, and $(MoVNbTa)_{0.25}S_2$, were predicted to be stable at relatively low growth temperatures. Subsequently, the first three of these alloys with approximately equimolar stoichiometries were successfully synthesized and the $(MoWVNbTa)_{0.20}S_2$ structure shows an exceptionally high electrocatalytic performance for $CO_2$ conversion.

Screening and synthesis attempts were restricted to equimolar HEAs of Mo, W, V, Nb, and Ta sulfides; the unary sulfides and their binary alloys have been observed to show good electrochemical performance. Eight of the ten possible binary alloys of these TMDCs have a positive mixing enthalpy and are, hence, immiscible at lower temperatures. However, they can be stabilized in single-phase solid solutions by growing them at higher temperatures where the configurational entropy, which favors miscibility, dominates the contribution to the Gibbs free energy (AG). The minimum growth temperature above which the alloy is miscible is referred to as its miscibility temperature $T_{misc}$, which can be calculated using first-principles methods, as has been previously demonstrated for binary alloys.

HEAs take advantage of the increase in configurational entropy due to the large number of components to stabilize a single-phase solid solution, even though pairwise alloys of the components might be immiscible. But because the number of required calculations to determine $T_{misc}$ scales exponentially with the number of alloy components, this method is intractable for HEAs. Instead, an easy-to-calculate temperature, $T_0$, is introduced that assesses the stability of HEAs relative to individual and binary components for a specific composition and is used to estimate $T_{misc}$. $T_0$ for an equimolar HEA is defined as the temperature above which ΔG of the solid solution is lower than that of all possible decompositions into mixtures of unary TMDCs and equimolar binary TMDC alloys. Computational details regarding this screening method are provided below (see 'Computational details' and 'Screening method'). While calculating the $T_{misc}$ of an N-component alloy requires sampling the mixing enthalpy of an (N−1)-dimensional composition space, calculating $T_0$ only requires the mixing enthalpy corresponding to equimolar binary alloys of the TMDCs being alloyed.

Figure 1B:
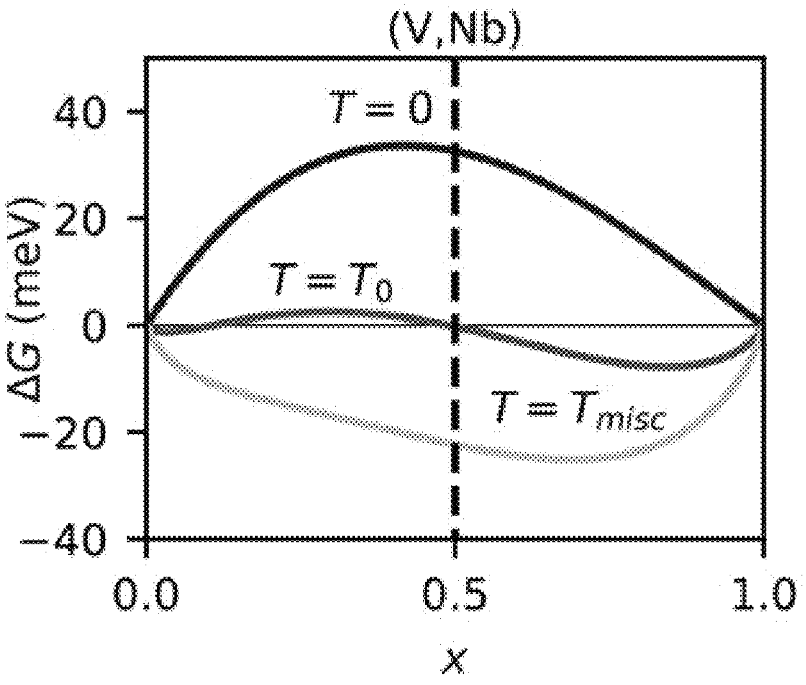
FIG. 1B is a graph of the free energy of (V,Nb) at three temperatures corresponding to 0 K, $T_x$, and the miscibility temperature $T_{misc}$.
Figure 1C:
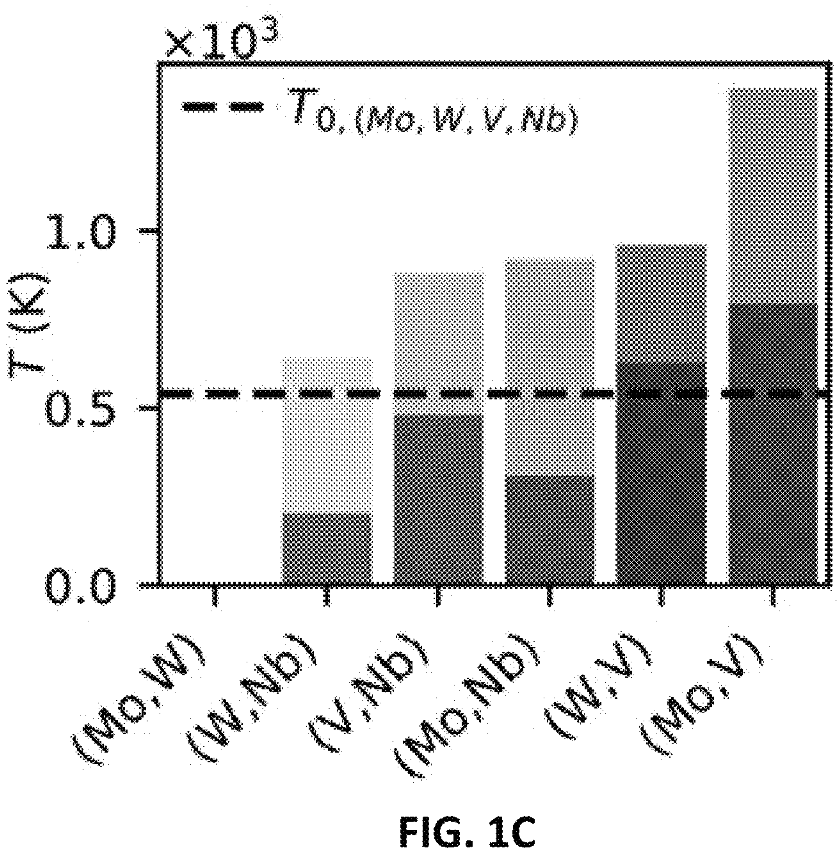
FIG. 1C is a graph of the miscibility temperatures of 6 binary alloys with the greyed portions corresponding to $T_x$, the temperature where the mixing free energy of the equimolar binary alloy becomes negative. The dashed line corresponds to $T_x$ for (Mo,W,V,Nb).

To illustrate how $T_0$ is calculated, the process for $(MoWNbV)_{0.25}S_2$, which is abbreviated as (Mo,W,Nb,V) is shown. The mixing enthalpies at multiple molar concentration values for the six possible binary alloys are plotted in FIG. 1A. From this plot, it is seen that (Mo,W) is the only pairwise alloy with a negative mixing enthalpy and is expected to be miscible at any temperature. All other pairwise binary alloys are immiscible at lower temperatures, which makes (Mo,W,Nb,V) a good case study to demonstrate how stability can be improved by adding more components. To show the relation between $T_0$ and $T_{misc}$, FIG. 1B shows ΔG of the (V,Nb) alloy at T=0 K, $T_0$, and $T_{misc}$. The alloy (V,Nb) is chosen for its relevance to the four-component alloy (Mo,W,Nb,V). At $T_0$, ΔG=0 at x=0.5 as per its definition; at $T_{misc}$, ΔG is concave up, meaning the disordered alloy is stable against phase separation$_{11}$. This procedure was repeated for the other five pairwise binary alloys, and the $T_0$ results are shown in FIG. 1C as shaded and unshaded bars, respectively. For each alloy, $T_0<T_{misc}$, and there is a strong correlation between $T_{misc}$ and $T_0$ (FIG. 6) with the exception of (Mo,Nb), which has a large asymmetric mixing enthalpy (FIG. 1A) that leads to a high $T_{misc}$ with a relatively low $T_0$.

Figure 1D:
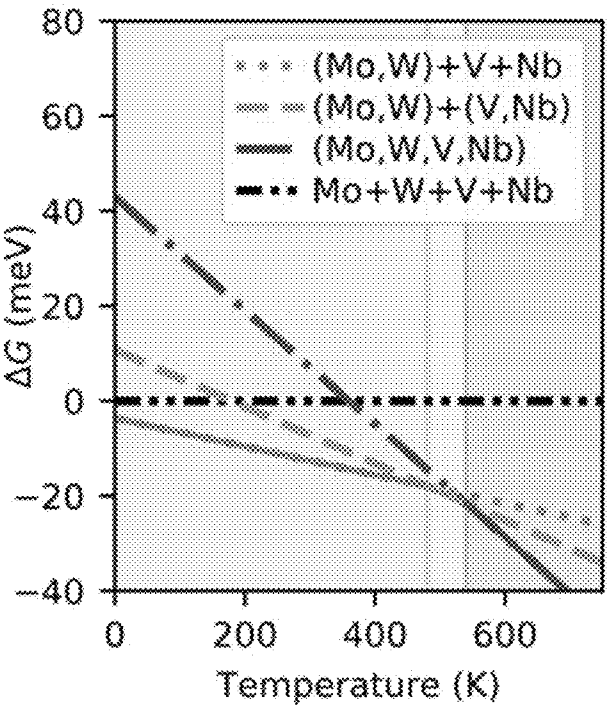
FIG. 1D is a plot of the equimolar free energy vs temperature for the partial decompositions that are stable at certain temperatures and the HEA and full decomposition for reference. The solid lines correspond to the most stable phase or phase mixture at a particular temperature.

To determine $T_0$ for (Mo,W,Nb,V), ΔG of all possible decomposition products and the HEA are plotted as a function of temperature. At each temperature, the phase mixture with the lowest energy is "stable" by our criterion. FIG. 1D shows the Gibbs free energy versus temperature for all phase mixtures that are, for some range of temperature, most stable. The solid, piece-wise line corresponds to the ground state amongst the various phases considered here at each temperature. It is seen that between 0-480 K, the ground state comprises of (Mo,W)+(Nb)+(V), followed by a mixture of (Mo,W)+(Nb,V) between 480-540 K. With increasing temperature above 540 K, the HEA becomes stable. This value corresponds to the dashed line in FIG. 1C and is lower than $T_0$ of two of the binary alloys (W,V) and (Mo,V). This shows that while $VS_2$ does not like alloying with other TMDCs, entropy-stabilization through the mixing of many components can stabilize TMDC alloys with V.

Figure 1E:
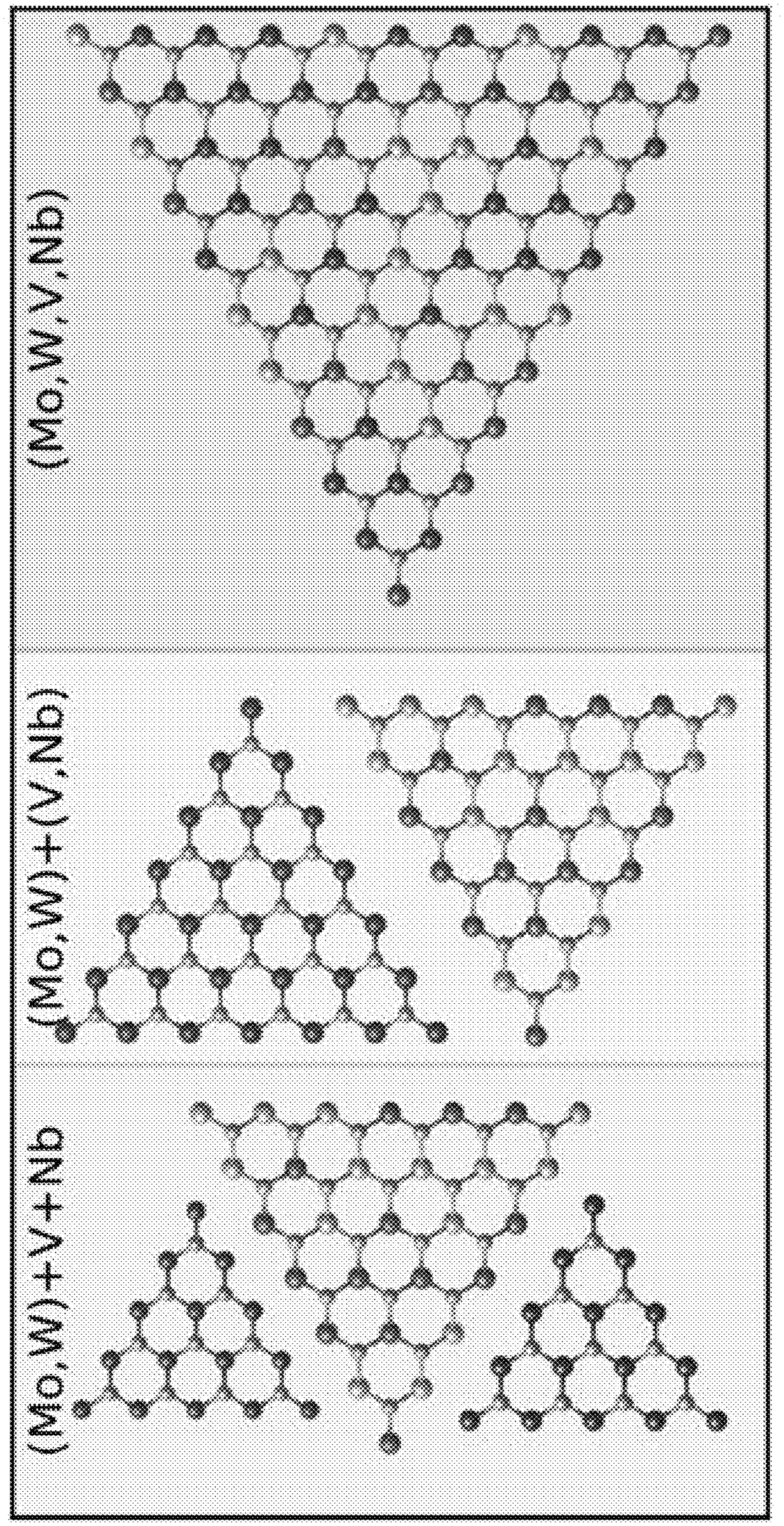
FIG. 1E is a diagram showing the decompositions represented in FIG. 1D.
Figure 6:
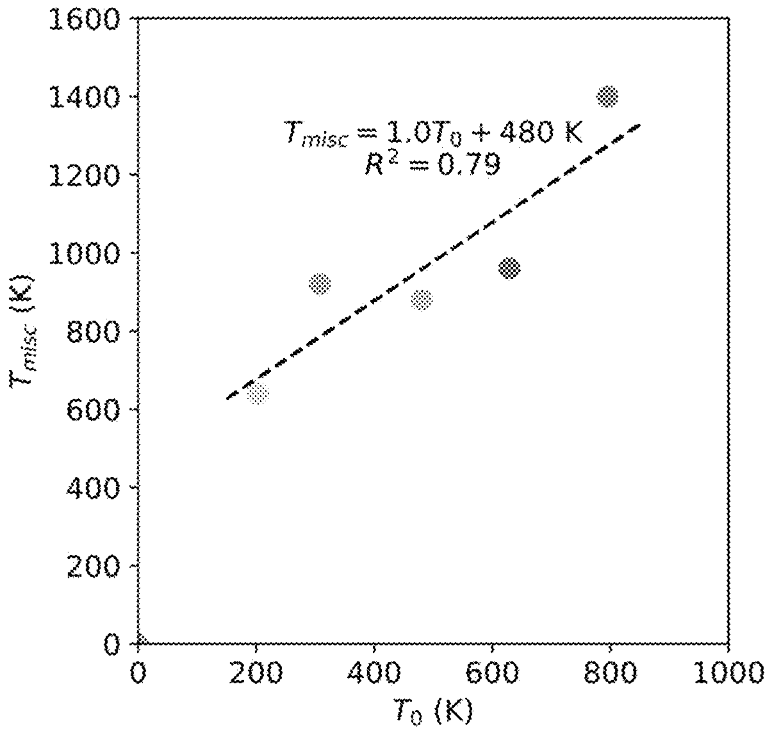
FIG. 6 is a plot of miscibility temperature vs $T_0$ for binary alloys. A linear fit is shown for the finite value data points showing a significant correlation between the miscibility temperature and our predictor $T_0$. The colors of the data points match the colors in FIG. 1A and FIG. 1C.
Figure 7A:
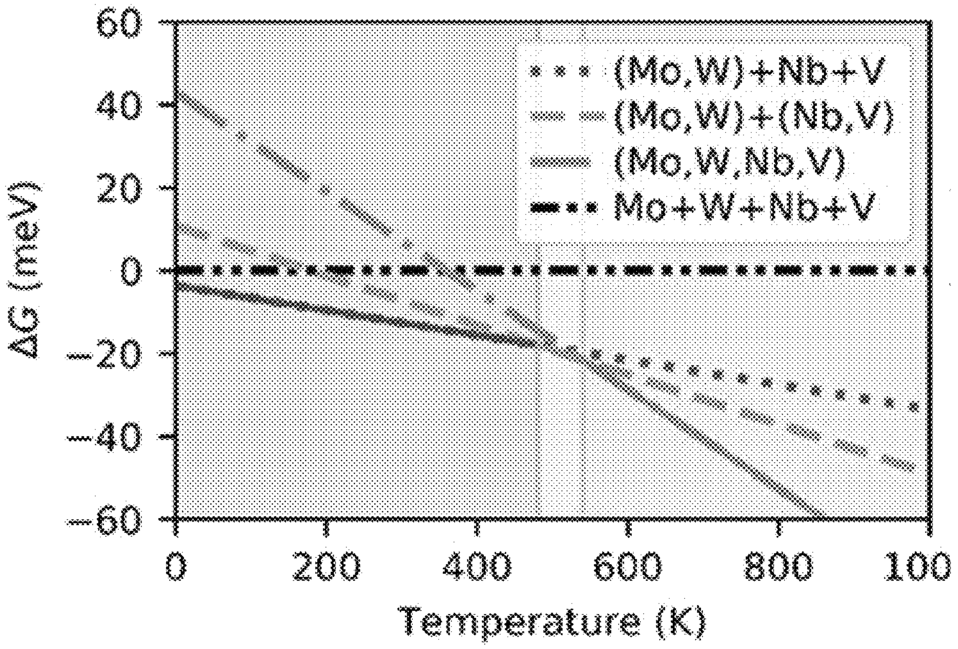
FIG. 7A is a plot of free energy vs temperature for HEAs and decomposition products of (MoW,Nb,V).
Figure 7B:
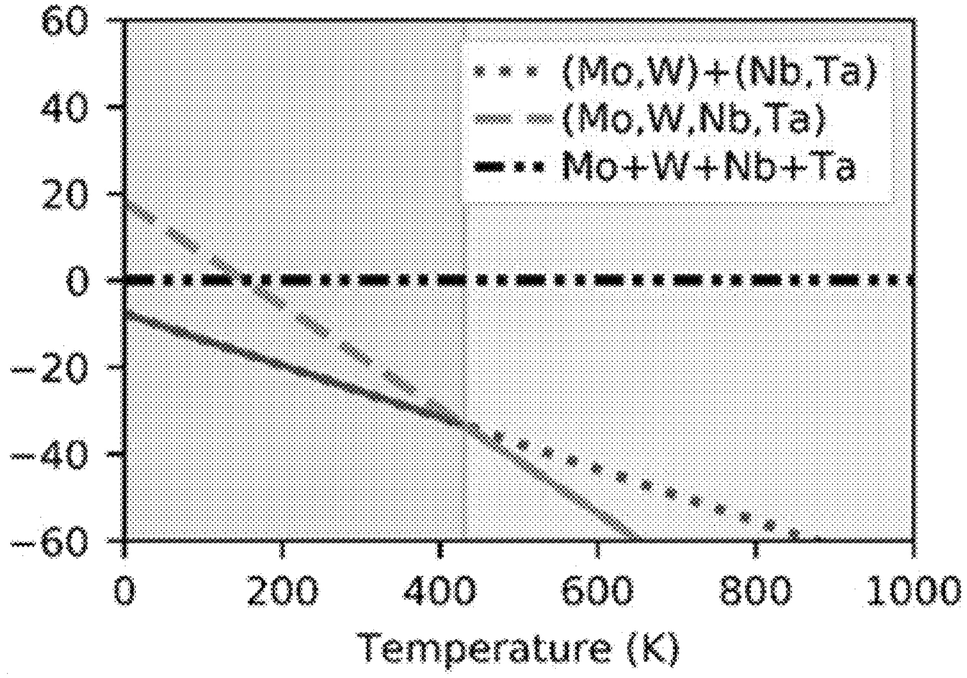
FIG. 7B is a plot of free energy vs temperature for HEAs and decomposition products of (Mo,W,Nb,Ta).
Figure 7C:
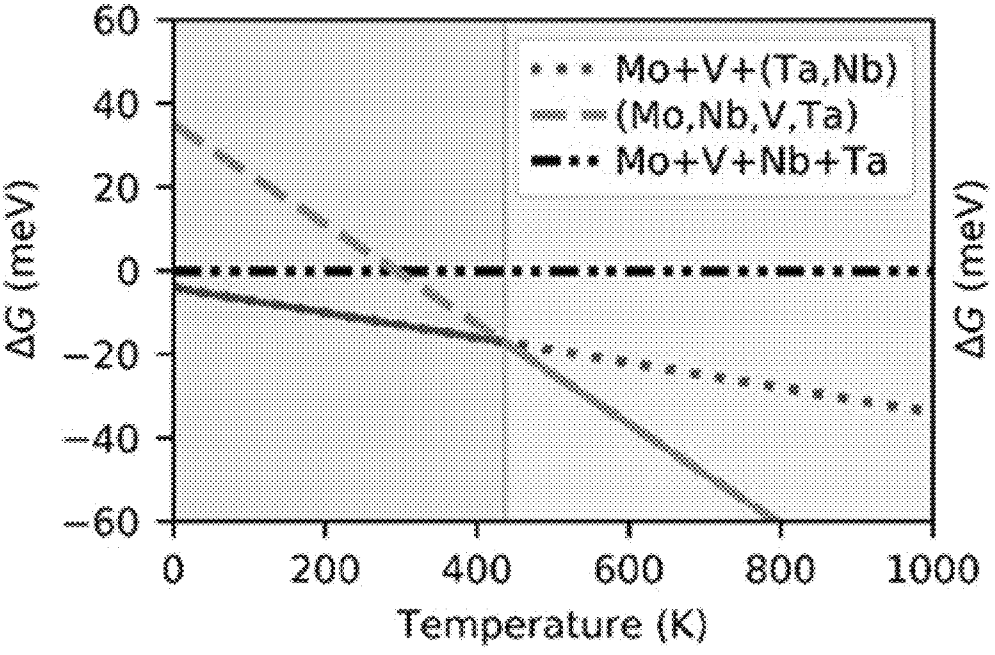
FIG. 7C is a plot of free energy vs temperature for HEAs and decomposition products of (Mo,Nb,V,Ta).
Figure 7D:
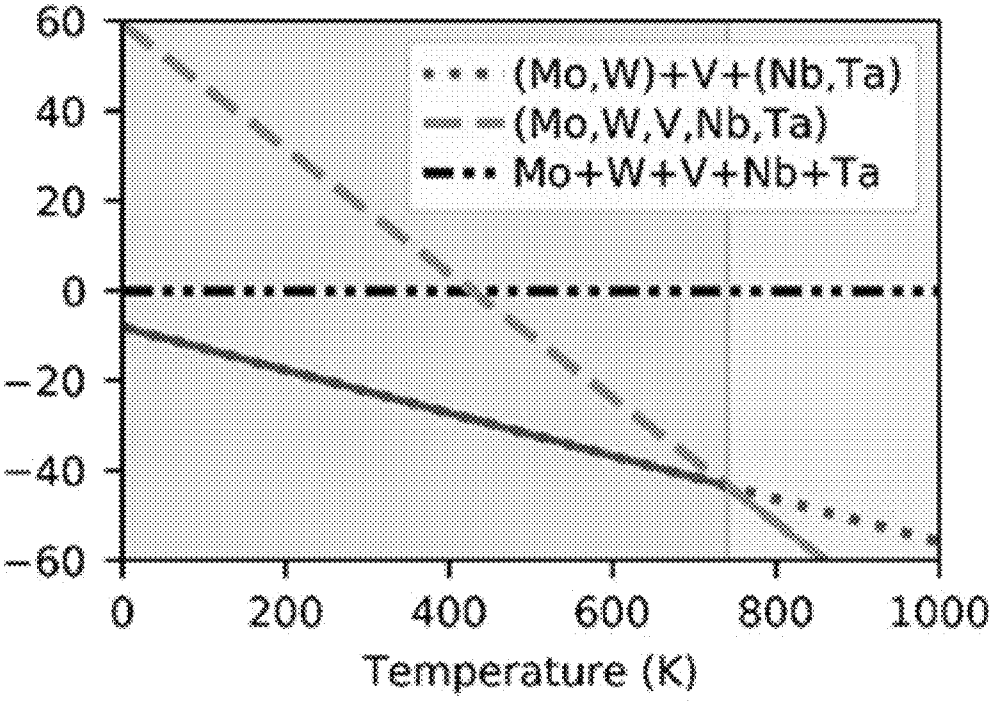
FIG. 7D is a plot of free energy vs temperature for HEAs and decomposition products of (Mo,W,V,Nb,Ta).
Figure 8A:
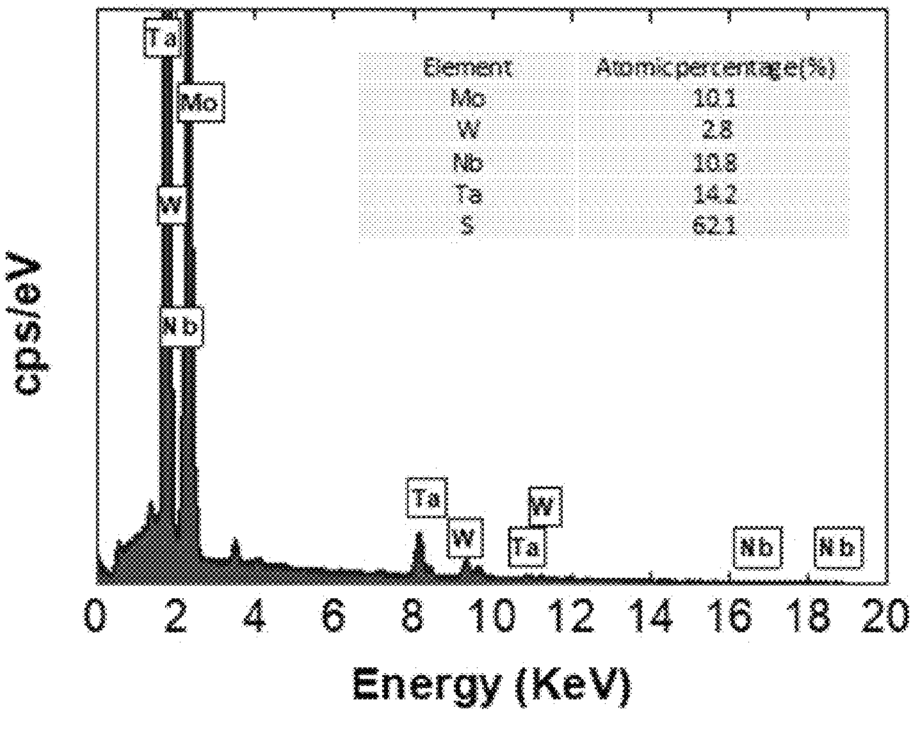
FIG. 8A is a graph of EDS composition mapping of $(MoWNbTa)_{0.25}S_2$.
Figure 8B:
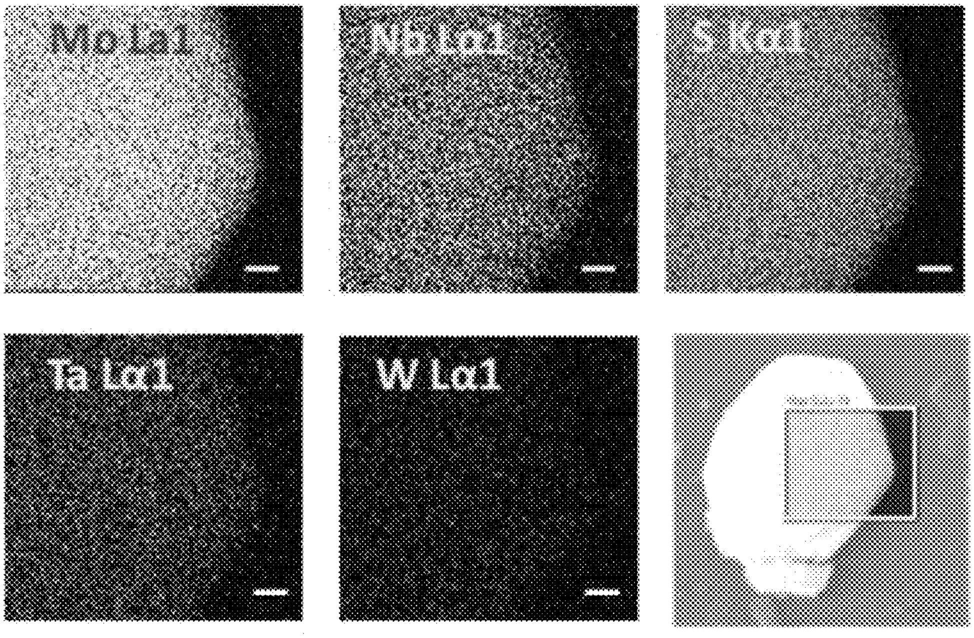
FIG. 8B is an EDS spectrum acquired from the area marked by a square. The quantification results are presented in the table, showing the average stoichiometry ratios (scale bar: 1 μm).
Figure 8C:
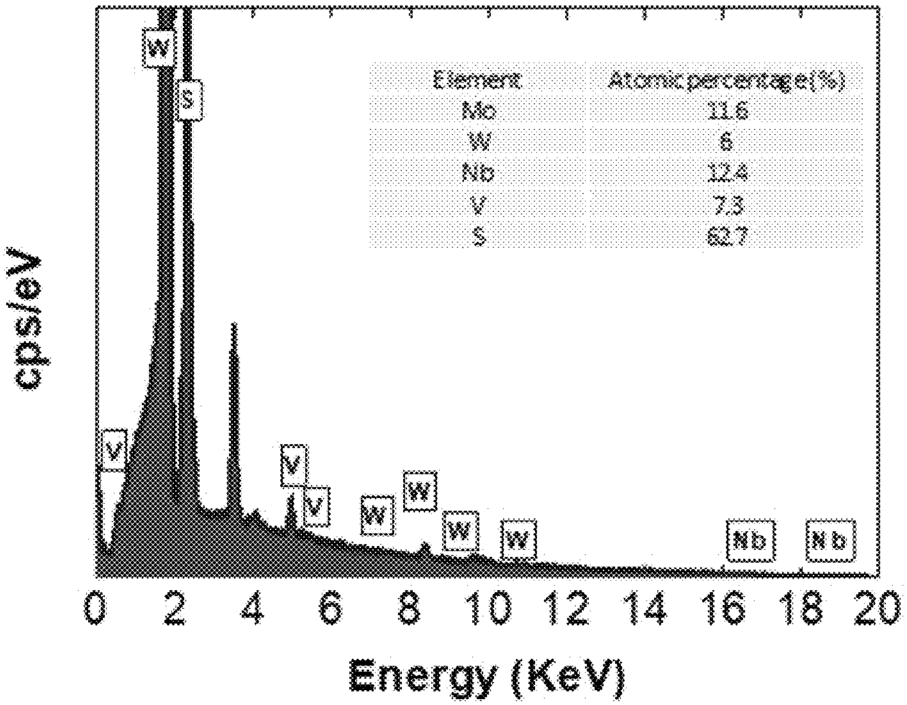
FIG. 8C is a graph of EDS composition mapping of $(MoWNbV)_{0.25}S_2$.
Figure 8D:
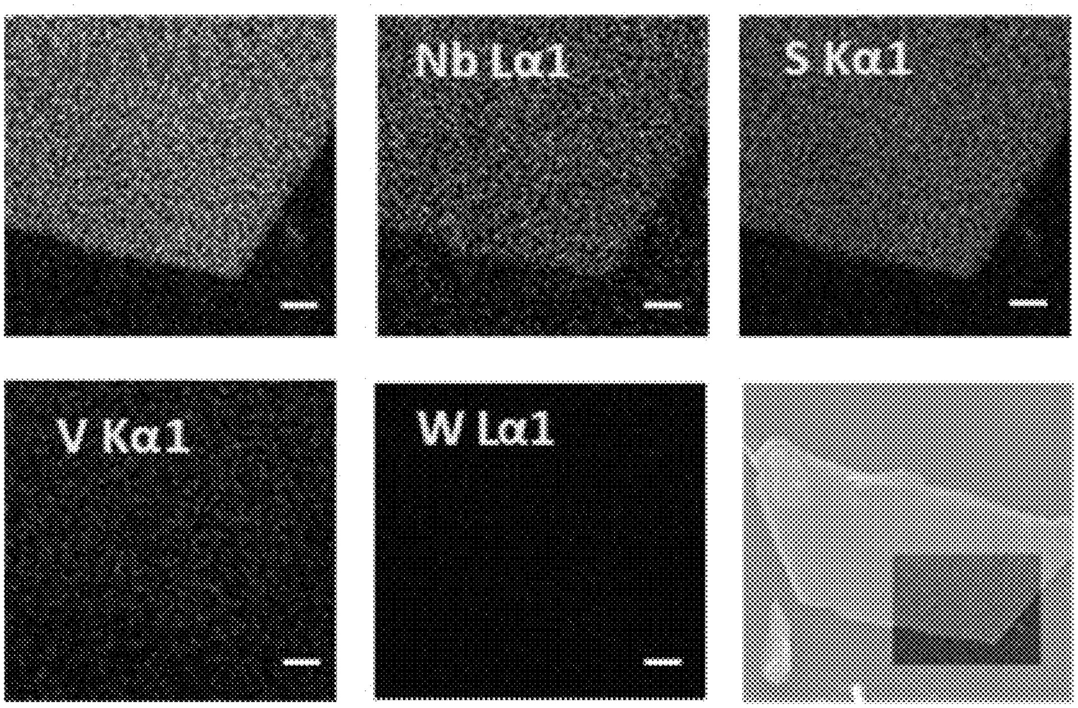
FIG. 8D is an EDS spectrum acquired from the area marked by a square. The quantification results are presented in the table, showing the average stoichiometry ratios (scale bar: 1 μm).

FIG. 1E shows atomic models of the two stable partial decompositions followed by the fully incorporated HEA. Using this procedure, it is found that $T_0$ for (Mo,V,Nb,Ta), (Mo,W,Nb,Ta), and (Mo,W,V,Nb,Ta) is 440 K, 440 K and 740 K, respectively (see FIGS. 7A, 7B, 7C, and 7D for free energy vs temperature plots similar to FIG. 1D). Estimating the miscibility temperature from the fit in FIG. 6 gives 920 K, 920 K, and 1220 K respectively. While these estimates are approximate, they suggest that these HEAs can be stabilized by growing them at achievable temperatures (~1, 000° C.).

To verify the stability predictions, three out of the four predicted HEAs were synthesized (see below 'Synthesis of high entropy TMDC alloys'). The experiments described below focused on the five component (Mo,W,V,Nb,Ta) alloy having the highest configurational entropy.

Figure 2A:
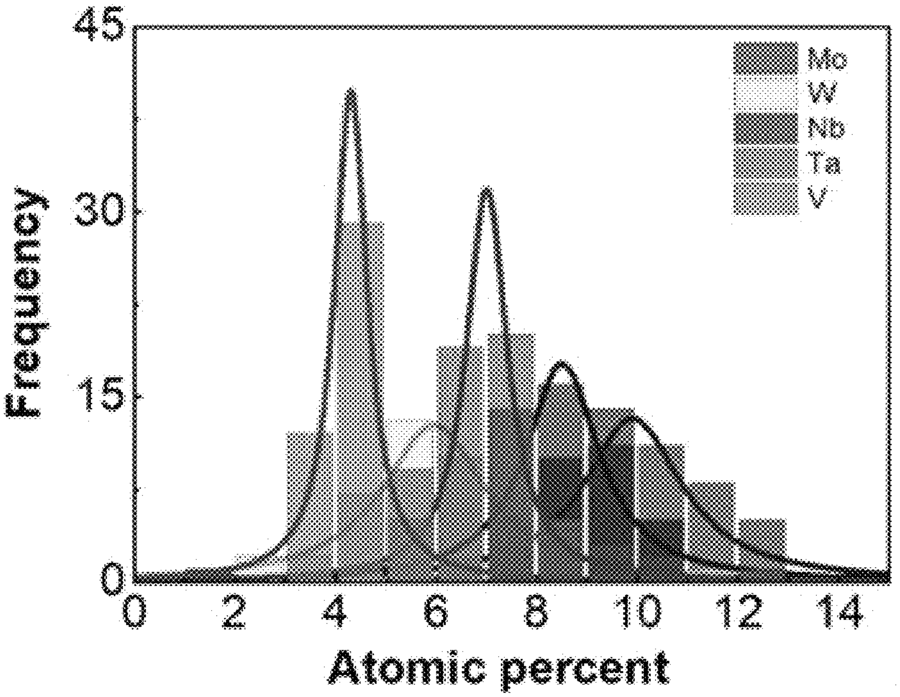
FIG. 2A is a histogram of TM stoichiometries from 60 synthesized flakes from SEM-EDX data.
Figure 2B:
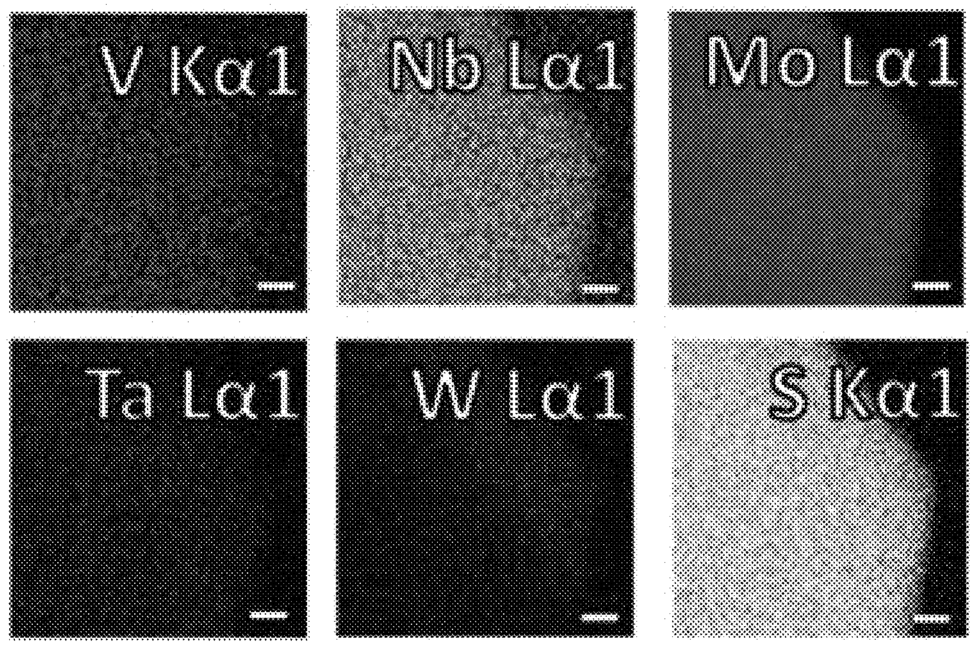
FIG. 2B is a set of images of elemental mapping EDS data showing a homogeneous spatial distribution of each TM in a representative (Mo,W,V,Nb,Ta) flake.

To experimentally verify the successful synthesis of the TMDC HEA (Mo,W,V,Nb,Ta), the following experiment was conducted. The synthesis was carried out using the chemical vapor transport (CVT) method in a single zone furnace followed by a liquid phase exfoliation technique to produce nanoflakes (NFs) of the synthesized materials as described in further detail below. FIG. 2A shows the frequency distribution of the principal elements collected from up to 60 NFs using scanning electron microscopy-energy dispersive x-ray spectroscopy (SEM-EDS). Only a small deviation from the equimolar ratios used for the synthesis is observed (~6.6 atomic percent) with a richer Mo content and a reduced concentration of V. FIG. 2B demonstrates SEM-EDS mapping of principle elements confirming a homogeneous spatial distribution of each element (FIG. 6).

Figure 2C:
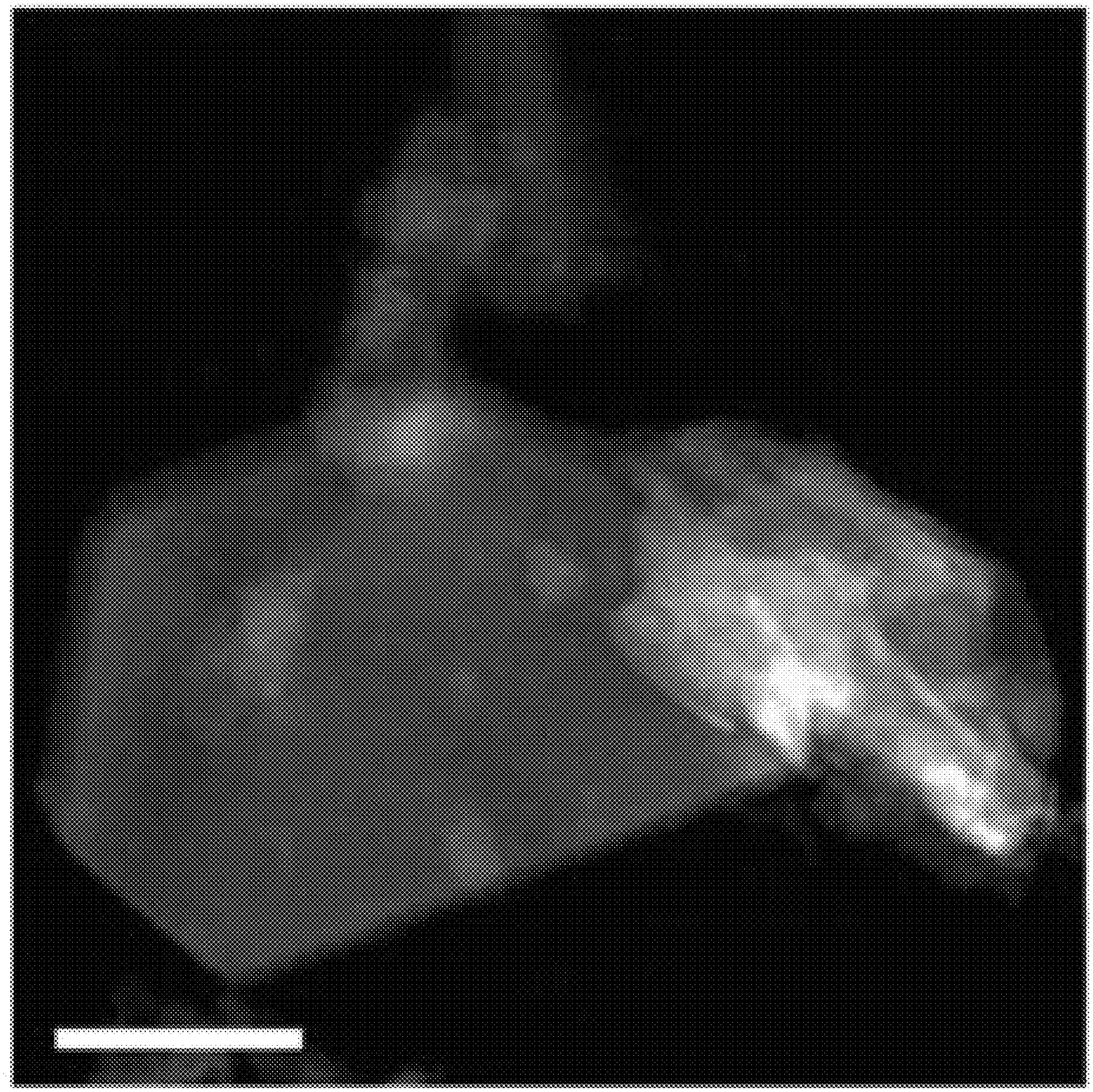
FIG. 2C is a STEM-HAADF image showing a typical high entropy TMDC flake. Scale bars correspond to 100 nm.
Figure 2D:
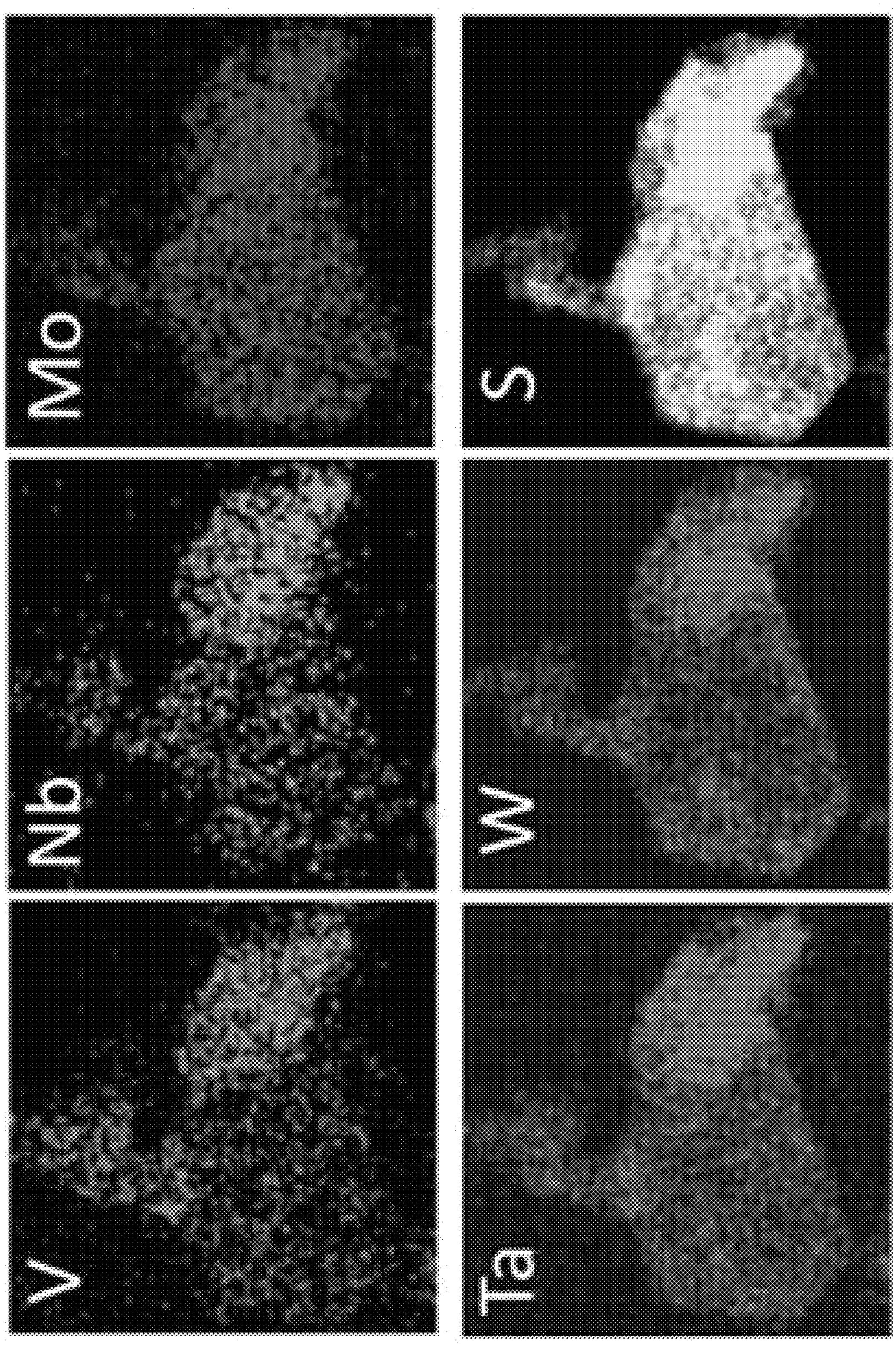
FIG. 2D is a set of images of EDS chemical maps showing V, Nb, Mo, Ta, W, and S distributions for the flake shown in FIG. 2C

To further characterize the structure and composition of these flakes at the atomic scale, aberration-corrected scanning transmission electron microscopy (STEM) combined with EDS analysis was used (see below at section 'STEM experiments and image simulations'). FIG. 2C shows the STEM high-angle annular dark field (HAADF) image of a typical multilayer (Mo,W,V,Nb,Ta) flake. The elemental EDS mapping, as shown in FIG. 2C, revealed a random distribution of elements throughout the flake indicating a lack of elemental segregation into pure or nearly pure TMDC domains. FIG. 2E shows an atomic resolution HAADF image obtained near the edge of a (Mo,W,V,Nb,Ta) flake, and FIG. 2F shows a magnified HAADF image of a region highlighted in FIG. 2E. In a HAADF image, the intensity of an atomic column is approximately proportional to the squared atomic number (~$Z^2$) of the elements in the column.

Figure 2G:
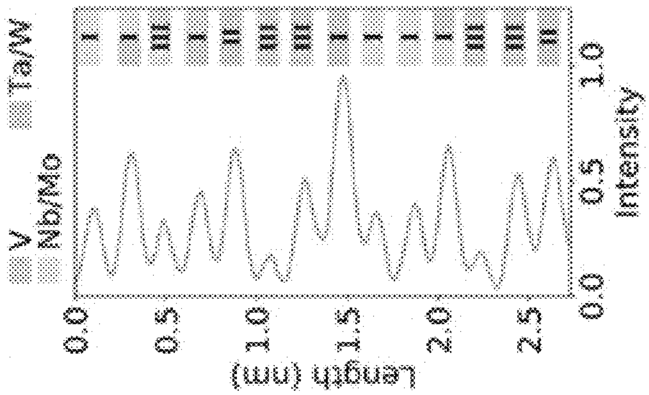
FIG. 2G is the intensity profile of the region illustrated in FIG. 2F as a green box, where the legends correspond to the predominant elements in each atomic column.
Figure 2F:
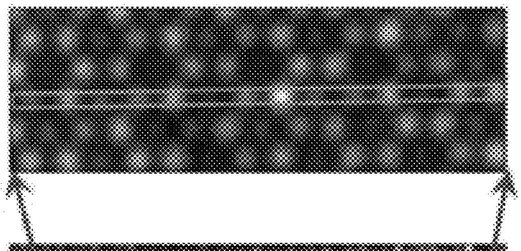
FIG. 2F is an atomic resolution STEM-HAADF image from the flake of FIG. 2E, showing local variations in the intensity of atomic columns due to varying compositions of cations.
Figure 2E:
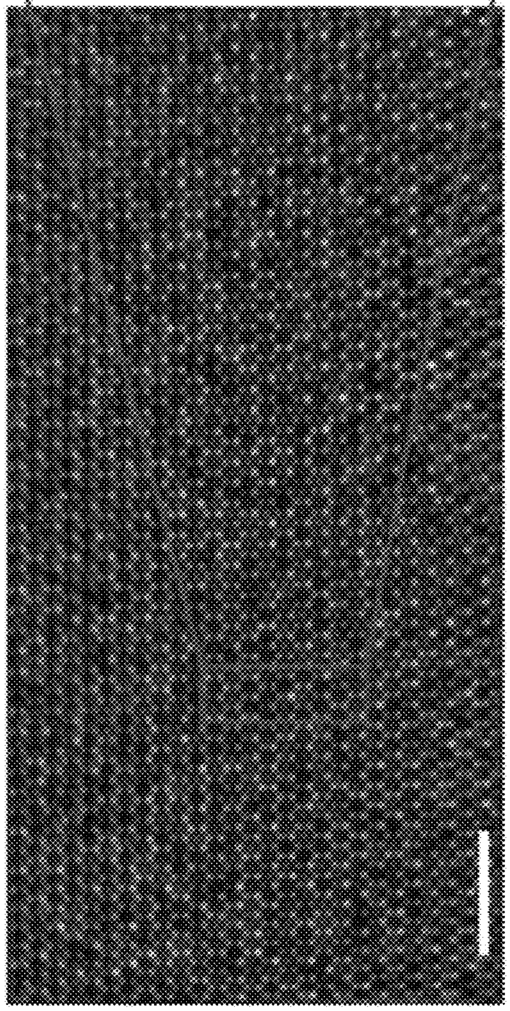
FIG. 2E is a STEM-HAADF image of a flake, where the highlighted region (red box) shows the [001] projection of a typical TMDC structure. Scale bars correspond to 2 nm.
Figure 9A:
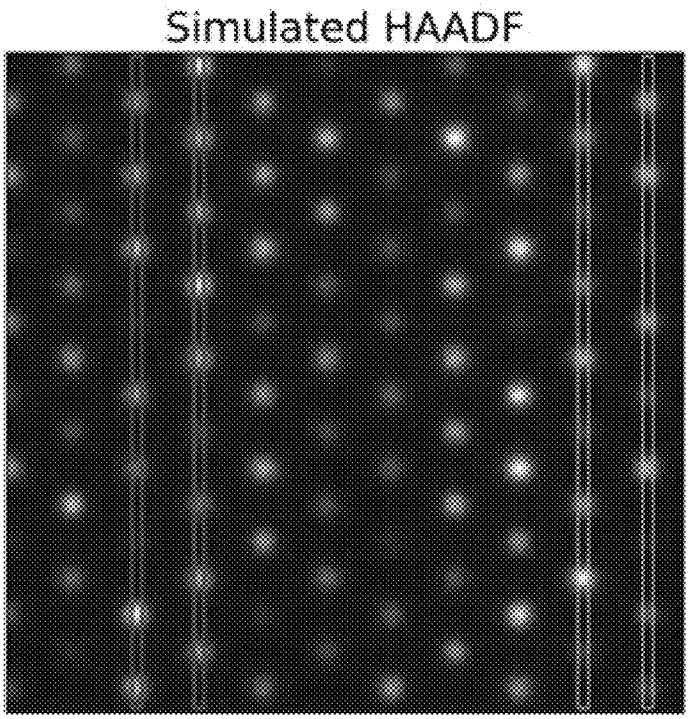
FIG. 9A is a simulated HAADF image of the 5-layer ABC stacked TMDC flake. The simulated image corresponds to that of a 5-layer ABC stacked TMDC flake with a total thickness of 34 Å.
Figure 9B:
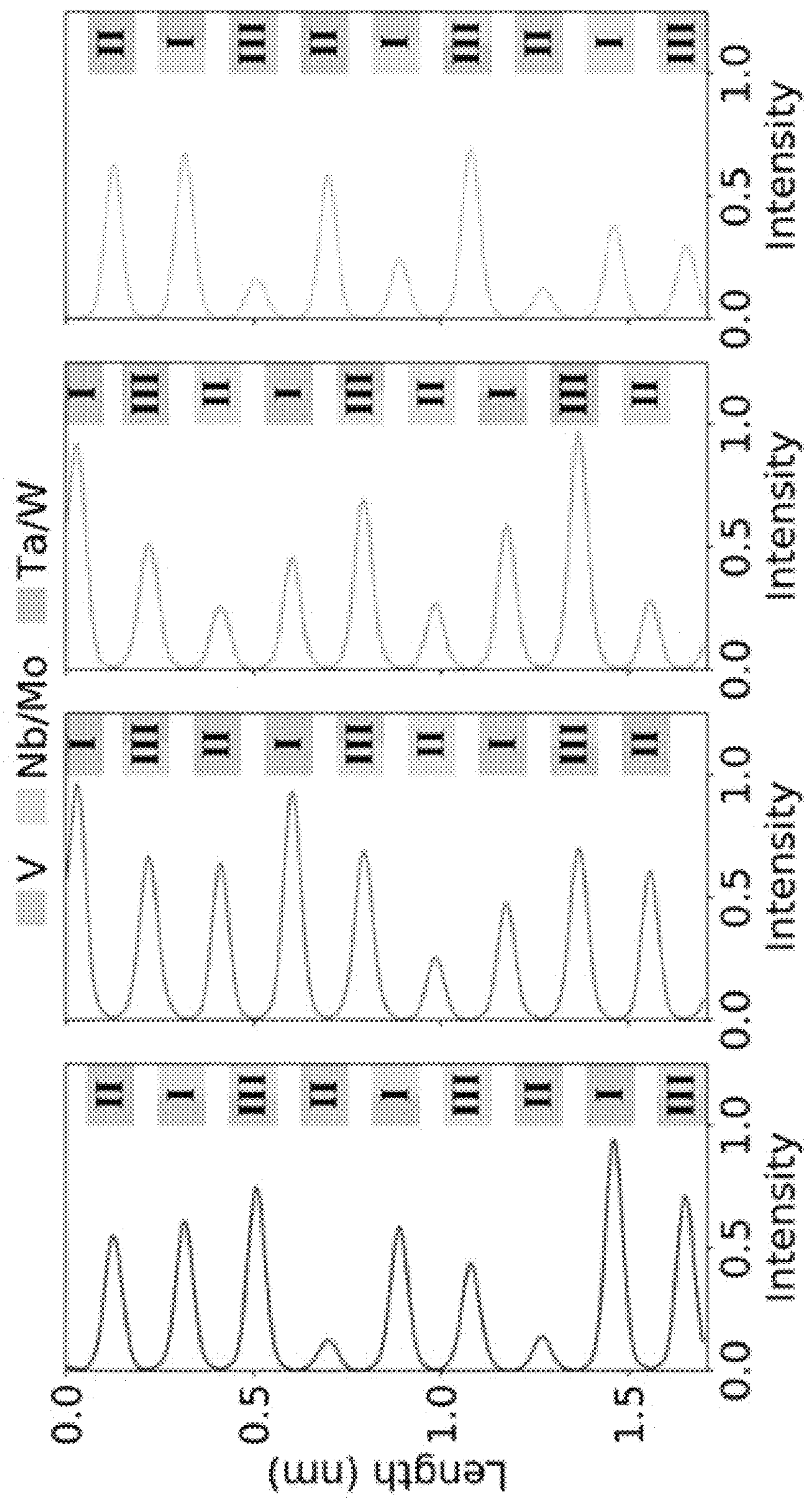
FIG. 9B contains a set of intensity profiles of the regions highlighted in FIG. 9A. The colors of the legends in FIG. 9B correspond to the cation composition, and numerals I, II and II represent the type of atomic columns. For this flake, there are three distinct types of atomic columns, I=(TM-S-S-TM), II=(S-S-TM-S-S), and III=(S-S-TM-S-S-TM), where TM=(V, Nb, Mo, Ta or W). For column types I and III, there are two TM-sites, while for column type II, there is one TM-site. The color of the legend in FIG. 9B and FIG. 2F gives the composition of these atomic columns, where the cation pairs of Nb/Mo and Ta/W are assigned the same color because experimental distinctions among these pairs are extremely challenging. We have filled the TM-sites in this generated structure such that all possible combinations of TM cations are realized in the structure. The composition of each atomic column in the simulated HAADF image corresponding is assigned to that of the 5-layer ABC stacked TMDC flake. Finally, the atomic composition in the experimental HAADF image (FIG. 2F) is assigned based on the best match with the simulated HAADF intensities. Similar to EDS analysis, the HAADF intensity analysis confirms the formation of a completely randomized TMDC structure.
Figure 10:
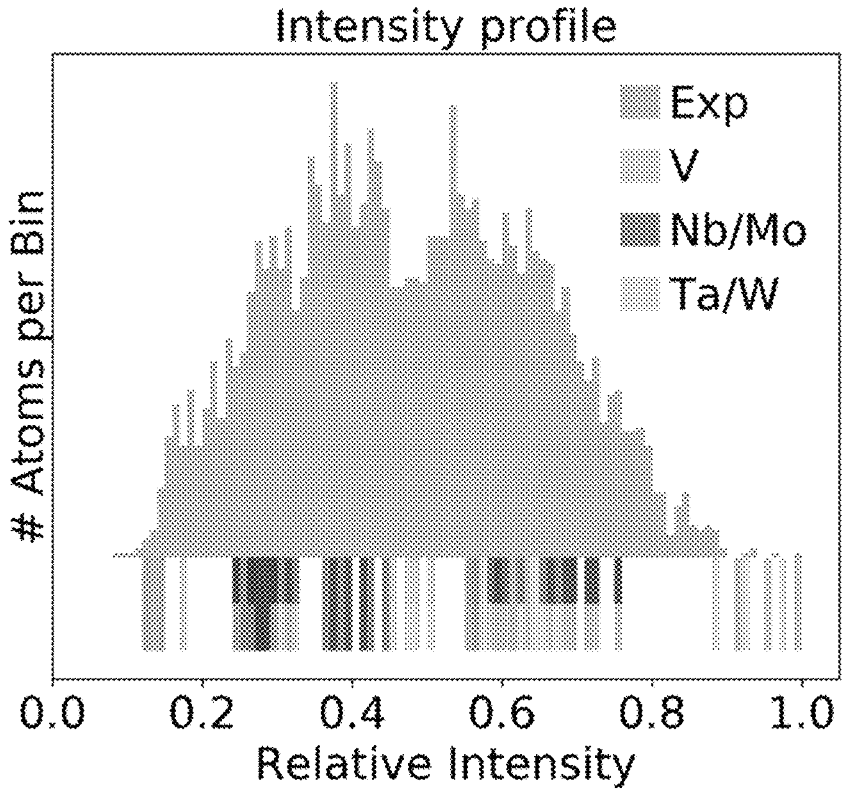
FIG. 10 is a graph of the comparison of the intensity profile of the experimental HAADF image (FIG. 2E) with unique intensities (corresponding to every unique atomic combination) from the simulated HAADF image (FIG. 9A). The colors of the bars for the simulated intensities correspond to the cation composition of the respective atomic column.

FIG. 2G shows the variation in the intensity of the atomic columns along a vertical line obtained from FIG. 2F. The heaviest elements, W and Ta, appear brightest, followed by Mo and Nb, then V, with the S columns having the lowest intensity. To assign the atomic composition for each column in FIG. 2F, STEM-HAADF image simulations were performed, details of which are provided below. The simulated HAADF image for a 5-layer ABC stacked TMDC structure with the 2H phase agreed best with the experimental HAADF image. For the 5-layer ABC stacked TMDC structure that was generated, there are three types of atomic columns along the incident electron beam, I=(TM-S-S-TM), II=(S-S-TM-S-S) and III=(S-S-TM-S-S-TM), where each TM-site is chosen from V, Nb, Mo, Ta or W, such that all possible TM permutations are included in the structure. The atomic composition of each column in the experimental image was assigned (FIG. 2F) based on the best match with the simulated HAADF image (see FIGS. 9A, 9B, and 10). STEM-HAADF intensity analysis further confirms the random distribution of the elements in the high entropy TMDC alloy.

Figure 3A:
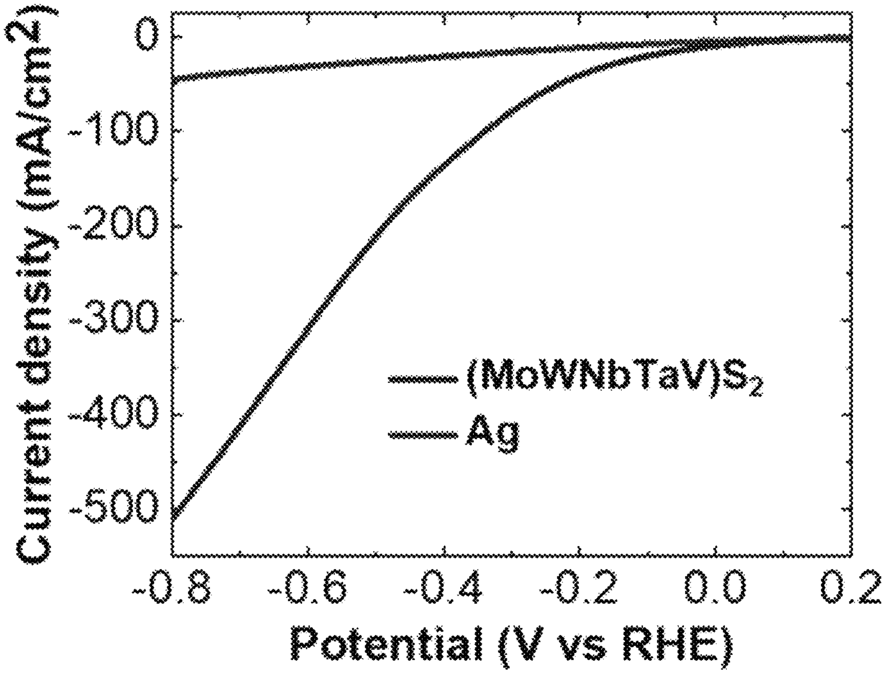
FIG. 3A is a graph of the current density of (Mo,W,V,Nb,Ta) and Ag nanoparticles plotted against V vs RHE using LSV.

Next, $CO_2$ electrochemical experiments were performed using (Mo,W,V,Nb,Ta) NFs as the cathode catalyst and compared the results with Ag nanoparticles (NPs) under identical experimental conditions and similar nanoparticle (average) size. The experiments were performed in a $CO_2$ saturated aqueous medium of 1 M KOH-1 M Choline Chloride (pH of ~7.4) (see below at section 'Electrochemical Reduction of $CO_2$'). All electrochemical tests were performed in an H-cell separated by Nafion 115. The three-electrode setup consists of Ag/$AgNO_3$ and Pt as the reference and counter electrode, respectively. First, linear sweep voltammetry (LSV) tests were conducted on both (Mo,W,V,Nb,Ta) NFs and Ag NPs coated on a gas diffusion layer at the scan rate of 50 mV $s^{-1}$. As illustrated in FIG. 3A, the current density for the (Mo,W,V,Nb,Ta) NFs at −0.8 V vs RHE is over 10 times higher than that of Ag NPs reaching up to ~510 mA $cm_{-2}$. This is the highest reported current density at −0.8 V vs RHE for $CO_2$ electroreduction among all the state-of-the-art catalysts reported in the literature.

Figure 3B:
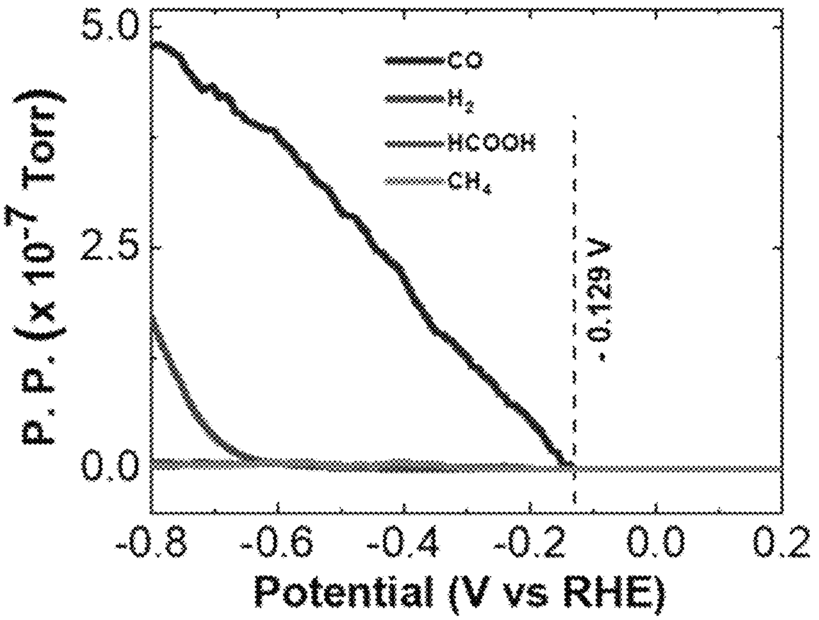
FIG. 3B is a graph of the partial pressures of gaseous byproducts of the electrochemical reaction on (Mo,W,V,Nb,Ta).
Figure 11:
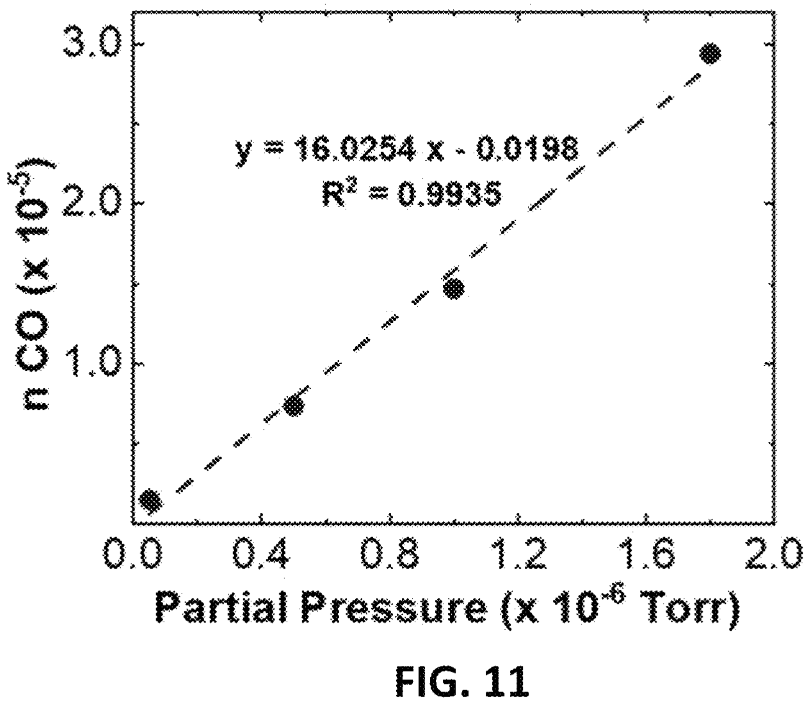
FIG. 11 is a CO calibration curve produced using DEMS.
Figure 12A:
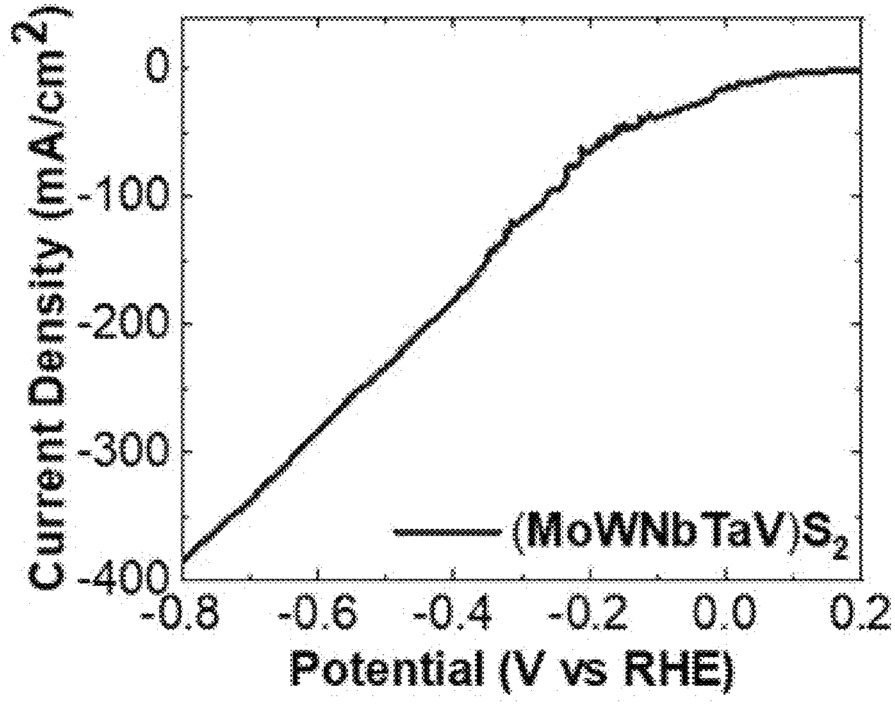
FIG. 12A is a graph of LSV results for $CO_2$ reduction using (Mo,W,V,Nb,Ta) NFs at a scan rate of 1 mV $s^{-1}$.
Figure 12B:
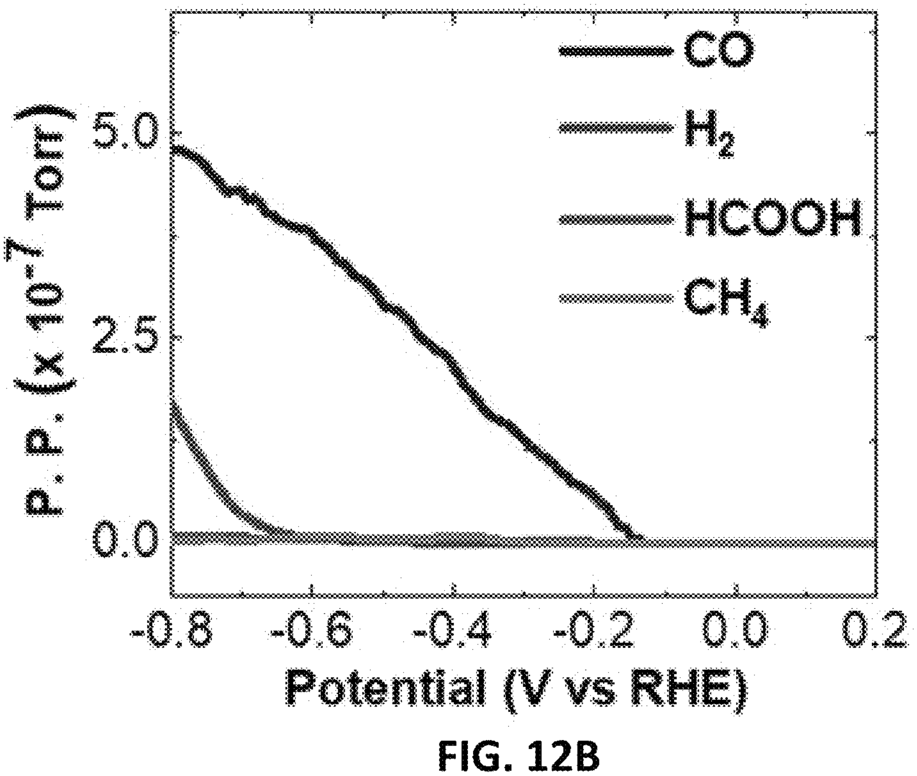
FIG. 12B is a graph of the DEMS analysis for CO, Hz, HCOOC, and $CH_4$. DEMS analysis shows the production of CO (blue) with an onset potential of −0.129 V vs RHE, Hz (red) with an onset potential of ~−0.62 V vs RHE, $CH_4$ (green) with an onset potential of −0.193 V vs RHE, and HCOOH (grey) with an onset potential of −0.286 V vs RHE.
Figure 12C:
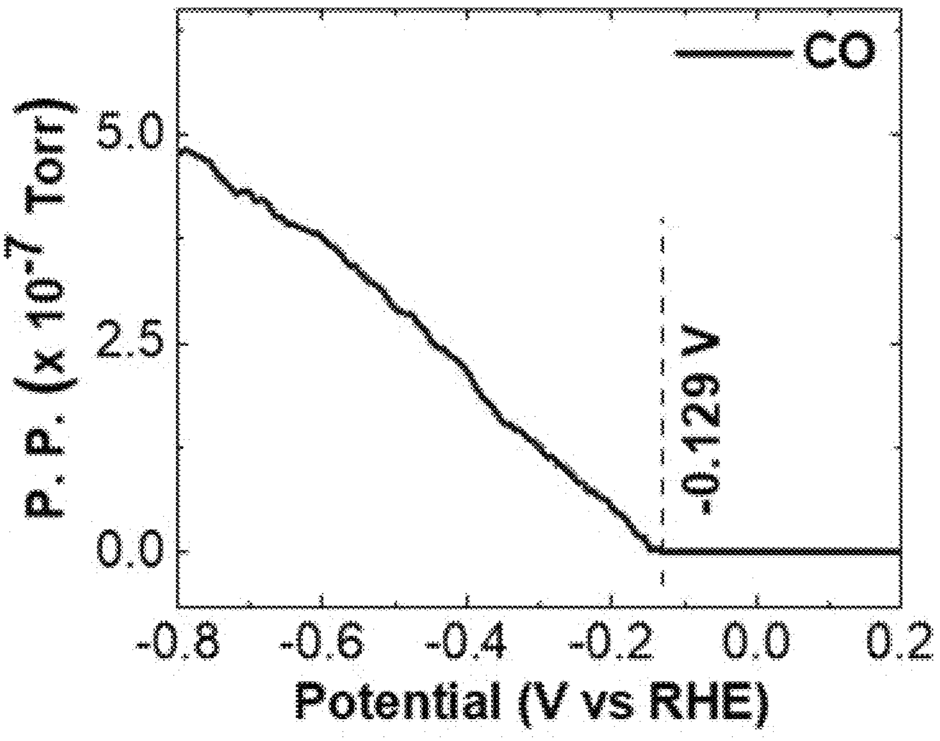
FIG. 12C is a graph of the DEMS analysis for CO with an onset potential of −0.129 V vs RHE.
Figure 12D:
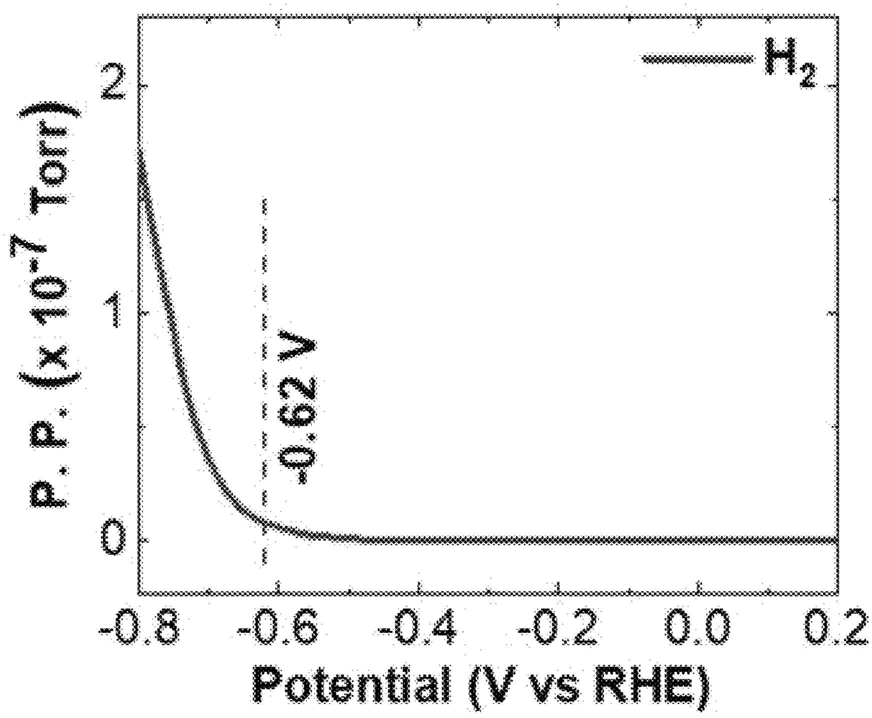
FIG. 12D is a graph of the DEMS analysis for Hz with an onset potential of ~−0.62 V vs RHE.
Figure 12E:
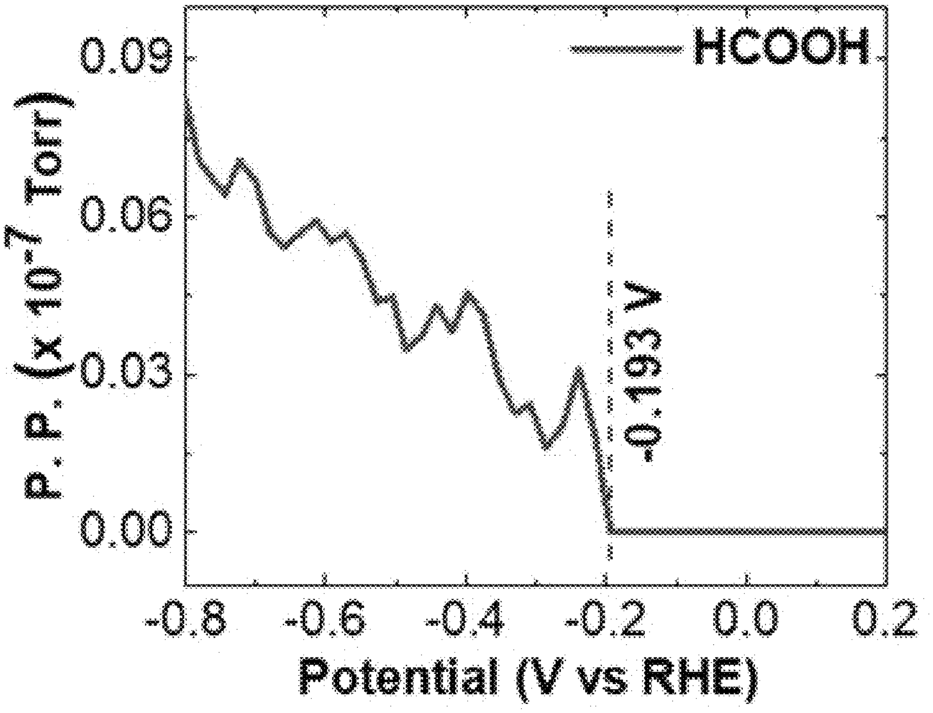
FIG. 12E is a graph of the DEMS analysis for HCOOC with an onset potential of −0.286 V vs RHE.
Figure 12F:
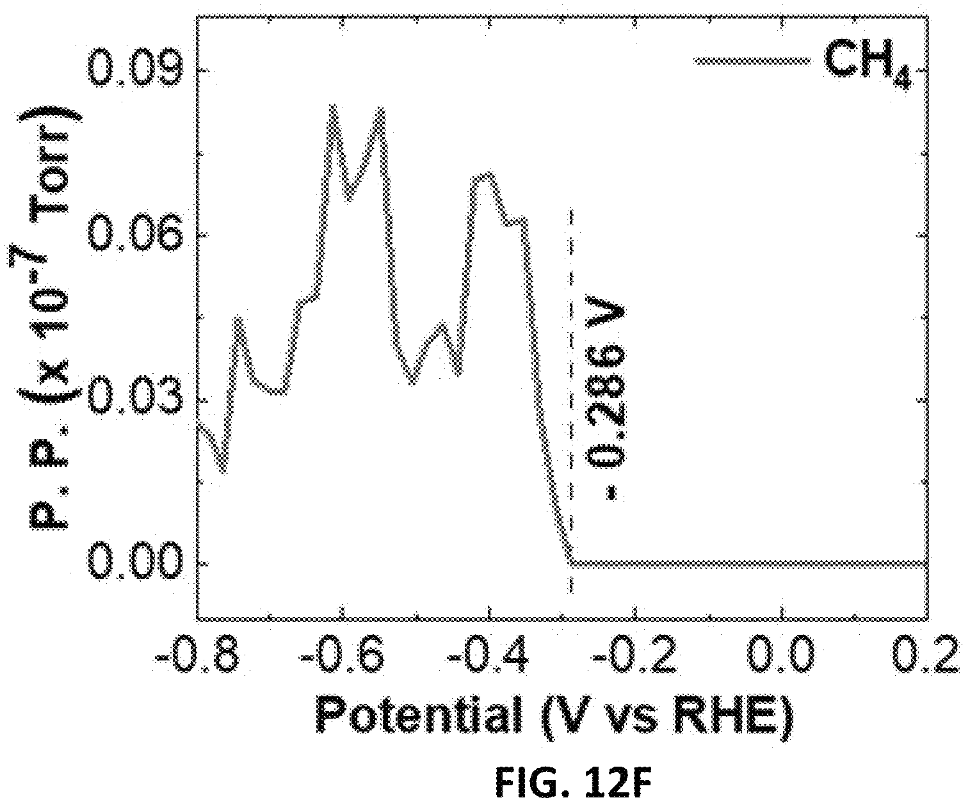
FIG. 12F is a graph of the DEMS analysis for $CH_4$ with an onset potential of −0.193 V vs RHE.

To detect the gaseous products, the cell was directly connected to a differential electrochemical mass spectrometer (DEMS) (see below at section 'Analytical method' and FIG. 11). FIG. 3B shows the gaseous products evolved during LSV experiments performed at a scan rate of 1 mV $s^{-1}$. The DEMS results show the formation of CO with a very small onset potential of −0.129 V vs RHE (only 19 mV overpotential). Moreover, CO remains the sole gaseous product until ~−0.6 V vs RHE at which $H_2$ evolution is observed. Furthermore, methane ($CH_4$) or formate (CHOOH) formation was insignificant in the tested potential range, suggesting that the $CO_2$ reduction reaction is mainly selective toward CO formation (FIGS. 12A, 12B, 12C, 12D, 12E, and 12F).

Figure 13A:
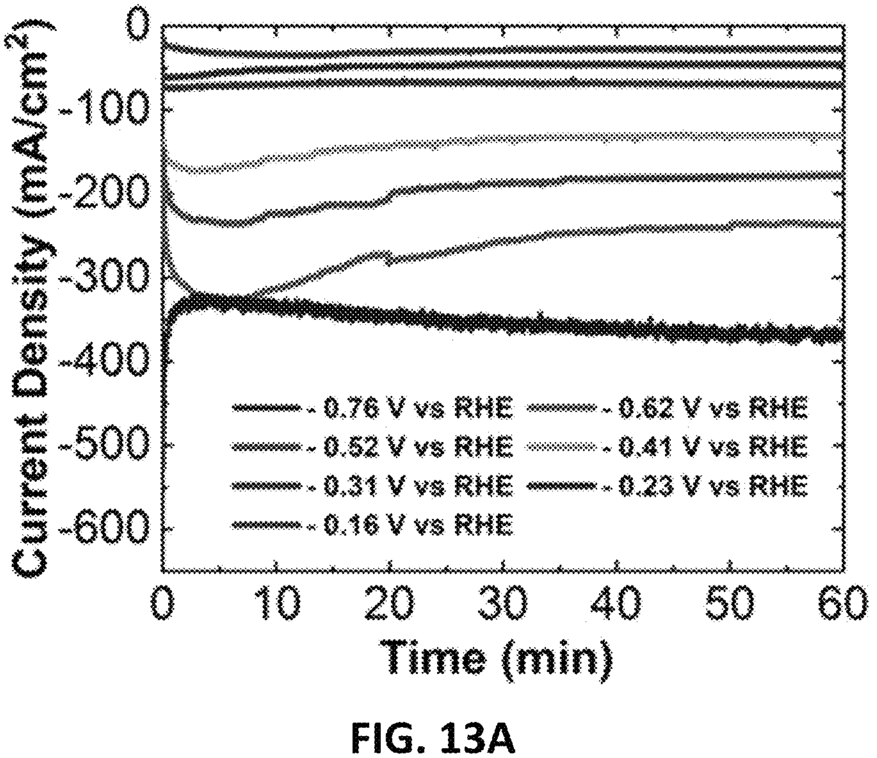
FIG. 13A is a current density profile for $CO_2$ reduction during chronoamperometry experiments at different potentials for (Mo,W,V,Nb,Ta).
Figure 13B:
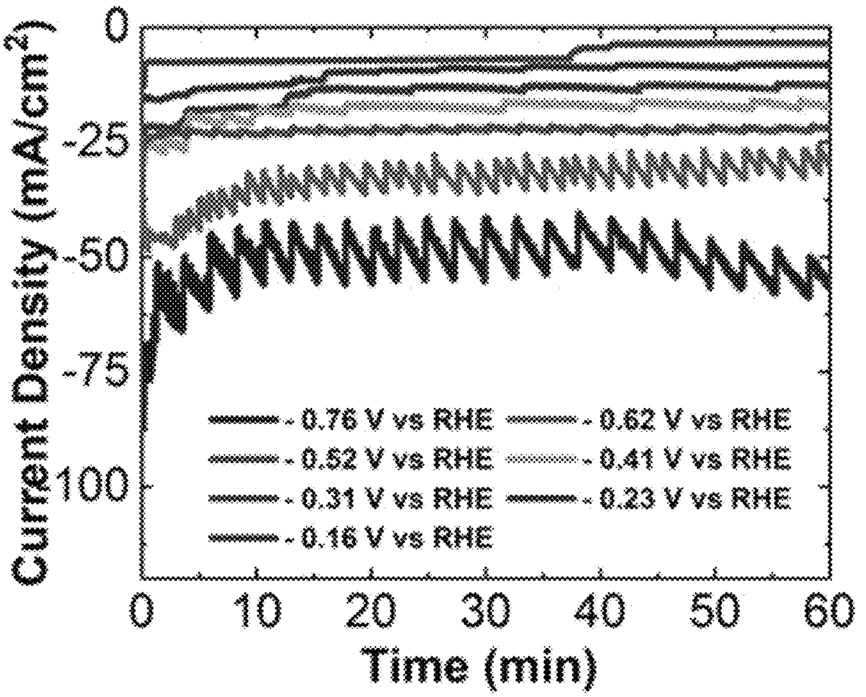
FIG. 13B is a current density profile for $CO_2$ reduction during chronoamperometry experiments at different potentials for Ag NPs. The zigzag trend is due to hydrogen bubbles desorption from the surface of the cathode catalyst.
Figure 14:
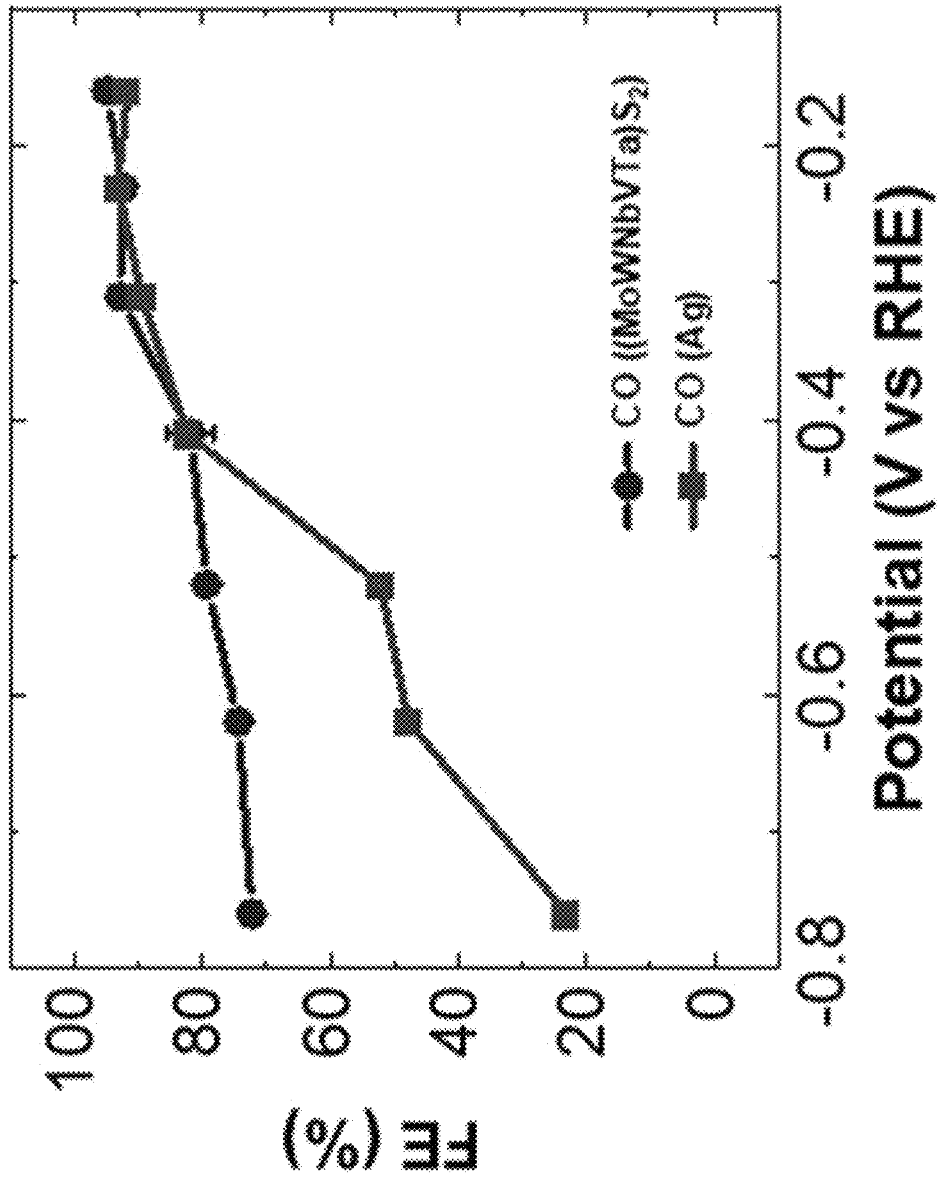
FIG. 14 is a graph of FE of CO from chronoamperometry experiments using $(MoWVNbTa)_{0.2}S_2$NFs (blue circles) and Ag NPs (grey squares) at different potentials. The FE for CO formation using (Mo,W,V,Nb,Ta) NFs, and Ag NPs are more than 90% for −0.16, −0.23 and −0.31 V, which drops to ~82% at −0.41 V. From −0.52 to −0.76 V vs RHE, FE for CO formation using (Mo,W,V,Nb,Ta) NFs gradually drops from 79.3% to 72.3%.

Chronoamperometry experiments were also performed using (Mo,W,V,Nb,Ta) NFs at seven different potentials, each for an hour in the same setup (FIGS. 13A and 13B). The results show consistent current densities with LSV experiments with up to ~20% drop which is attributed to the charging current (capacitive behavior) in the CV measurements (FIGS. 13A and 13B). Faradic efficiency (FE) for the formation of CO (FIG. 14) was found to be ~95% at ~0.16 V vs RHE and more than 92% at −0.23 and −0.31 V vs RHE. However, the FE value for CO formation starts to drop after ~0.31 V vs RHE and reaches 72% at −0.76 V vs RHE compared to ~22% for Ag NPs.

Figure 3C:
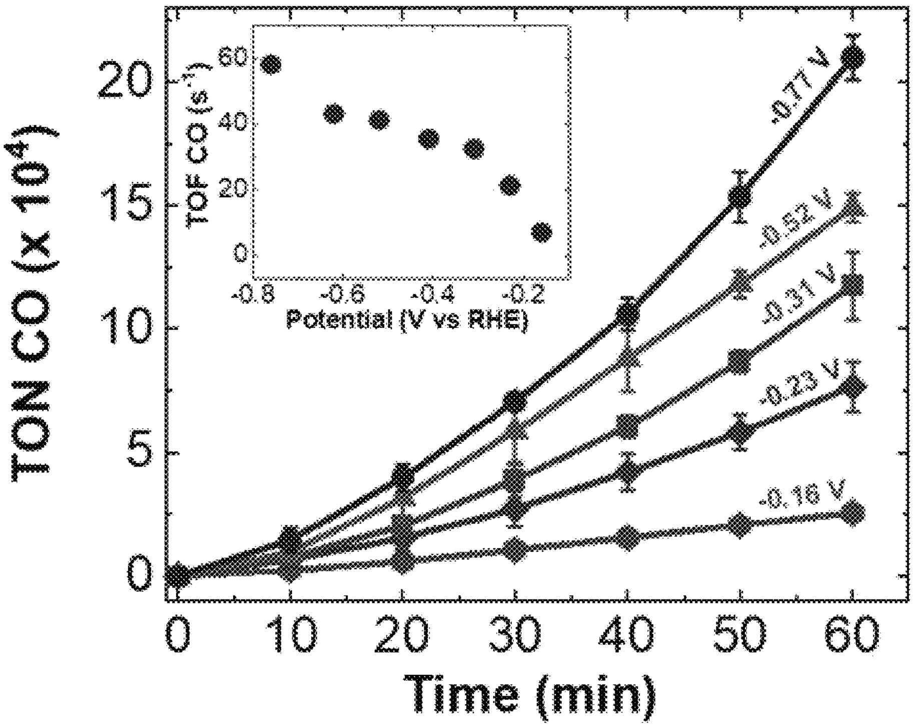
FIG. 3C is a graph of the turnover numbers (TON) of CO formation over the course of an hour at various voltages with the turnover frequency (TOF) of the LSV inset.

Turnover numbers (TON) of CO formation over an hour were also calculated and shown in FIG. 3C (see below at section 'Faradaic efficiency, turnover number, and energy efficiency measurements'). These results indicate that the TON value reaches a maximum of approximately 209,885 at −0.76 V vs RHE. The turnover frequency (TOF) values at the potential range of −0.16 to −0.76 V vs RHE are shown in the inset of FIG. 3C. The TOFs at −0.16, −0.23, and −0.31 V vs RHE are 7.13, 21.32, and 32.65 $s^{-1}$, which are by far the highest value among all catalysts reported so far. The TOF for CO formation is 58.30 $s^{-1}$ at −0.76 V vs RHE for the (Mo,W,V,Nb,Ta) NFs, which is more than ~44 times higher compared to that for Ag NPs (1.32 $s^{-1}$) tested under identical conditions.

Figure 3D:
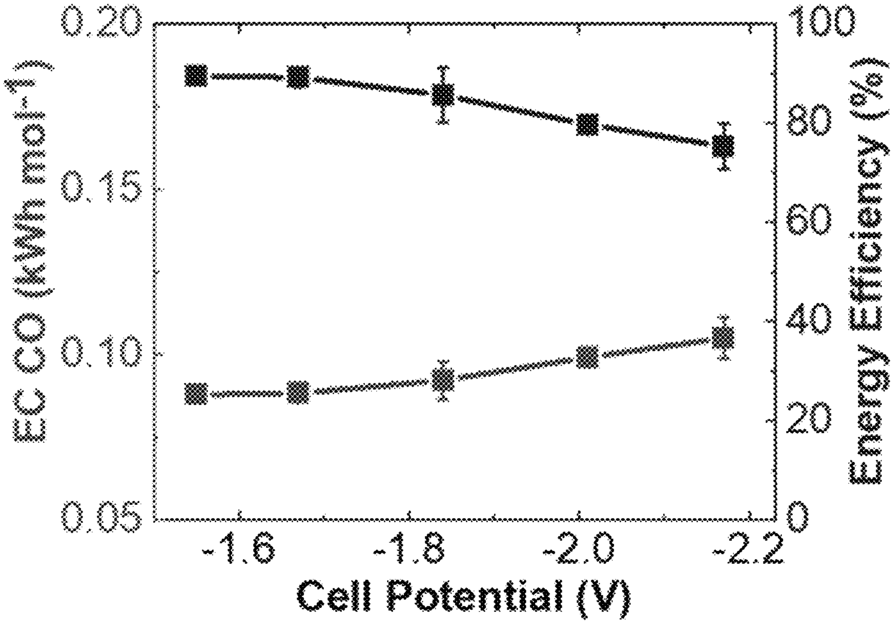
FIG. 3D is a graph of the energy consumption (EC) and energy efficiency of CO formation.

We also evaluated the energy consumption per mole of CO (EC CO) and energy efficiency of the conversion process at five different cell potentials (see below at 'Faradaic efficiency, turnover number, and energy efficiency measurements'). As shown in FIG. 3D, the EC CO values range from 0.08 kWh $mol^{-1}$ at −1.55 V with a gradual increase up to 0.1 kWh $mol^{-1}$ at −2.17 V. High energy efficiency values were also observed at these cell potentials, which gradually decreased from ~90% to 75.3% with potential increments. Error bars show no more than ±5% deviation for FE, TON, EC CO, and energy efficiency values.

Figure 4A:
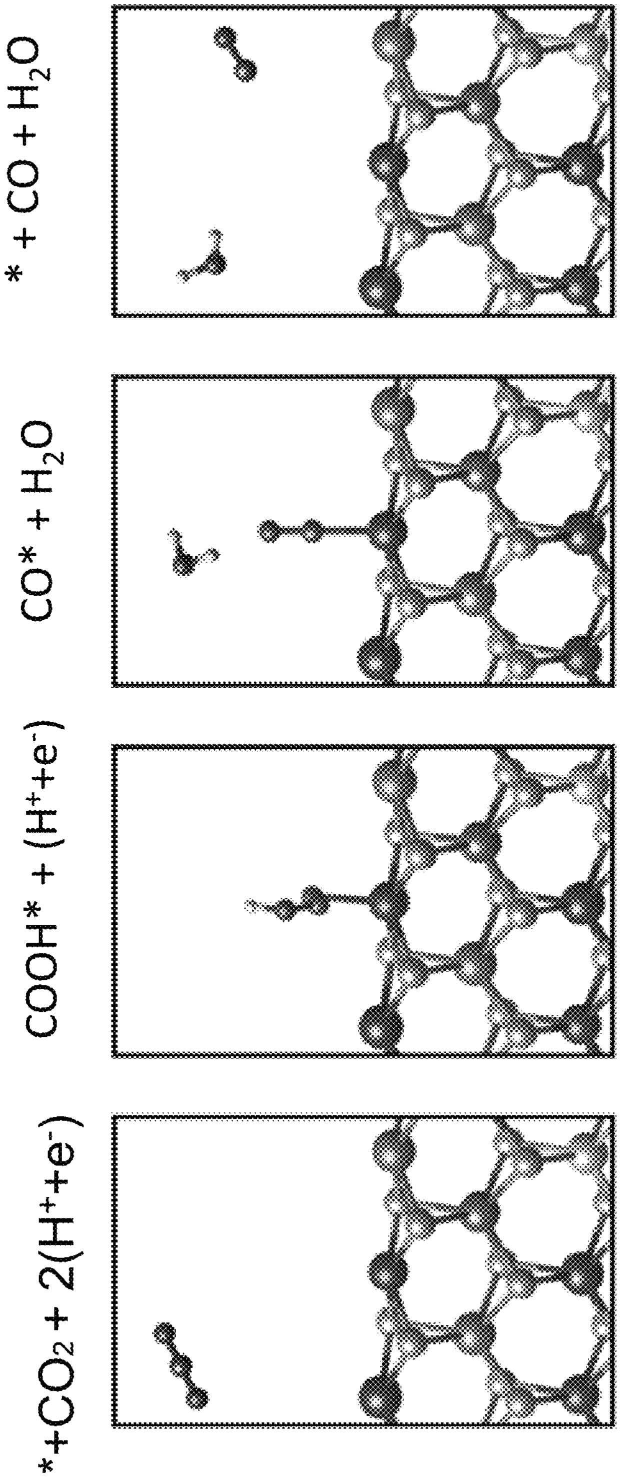
FIG. 4A is a HEA ribbon SQS visualization at each step of the catalytic reaction with molecules adsorbed to the V site (configuration Ribbon-00).
Figure 15:
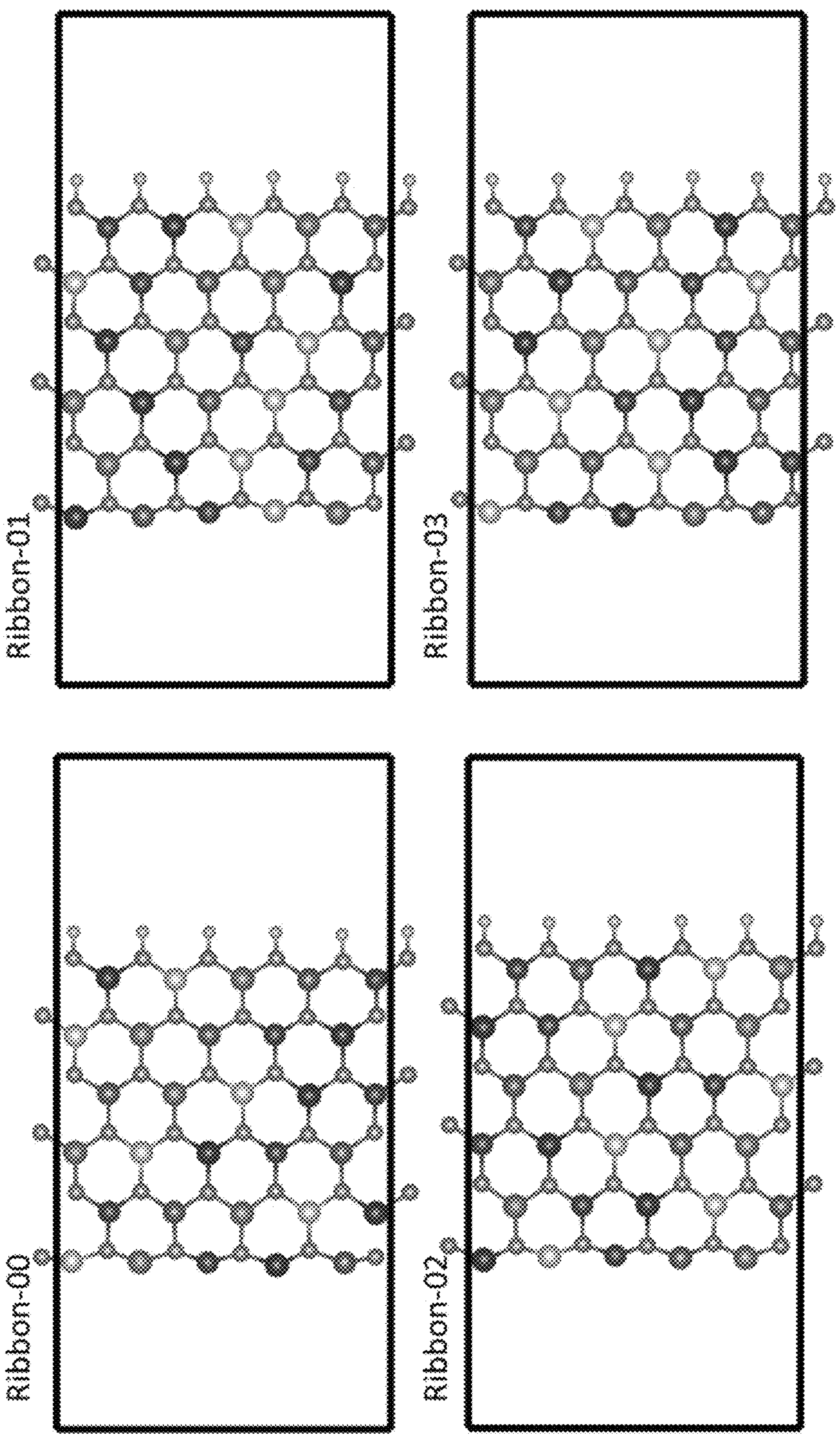
FIG. 15 is a set of schematics of different HEA ribbon configurations for (Mo,W,V,Nb,Ta). They are SQSs that are specifically selected to maximize the number of TM-edge nearest neighbor combinations. These configurations are labeled ribbon-00-03. Simulating the properties of alloyed ribbons requires the use of SQSs for the same reasons that simulating sheets of alloyed TMDCs does; ribbons, however, are especially sensitive to the selection of SQSs. Different SQSs will have different permutations of neighboring transition metal atoms at their edges. These differences in the local environment around a transition metal site may have a large effect on the adsorption energy of intermediate molecules at that site. For this reason, we used four ribbon SQSs corresponding to (Mo,W,V,Nb,Ta) with differing edge site configurations.

To gain more insight into the remarkable catalytic activity of (Mo,W,V,Nb,Ta) NFs, especially at low overpotentials, DFT calculations were carried out to determine the free energy changes at possible active sites of (Mo,W,V,Nb,Ta) nanoribbons and study the corresponding reaction pathways (see below at section '$CO_2$ reduction reaction pathway'). These free energies were determined using the computational hydrogen electrode approach at the equilibrium potential where the free energy of the products and the reactants are the same (see below at section 'Determining free energy'). Theoretical catalysis results were obtained for the HEA and select pure TMDCs and silver. FIG. 4A shows an illustration of each step of the $CO_2$ reduction reaction at the V site of a (Mo,W,V,Nb,Ta) nanoribbon. To capture the effect of different nearest-neighbor coordination on the catalytic activity of each transition metal active site, four different nanoribbon configurations of this HEA, labeled Ribbon-00-03, were studied (see below at section 'HEA ribbon configurations' and FIG. 15). Using multiple nanoribbon configurations allows us to take configurational averages and ensure our results are reliable and not specific to a single configuration.

Figure 4B:
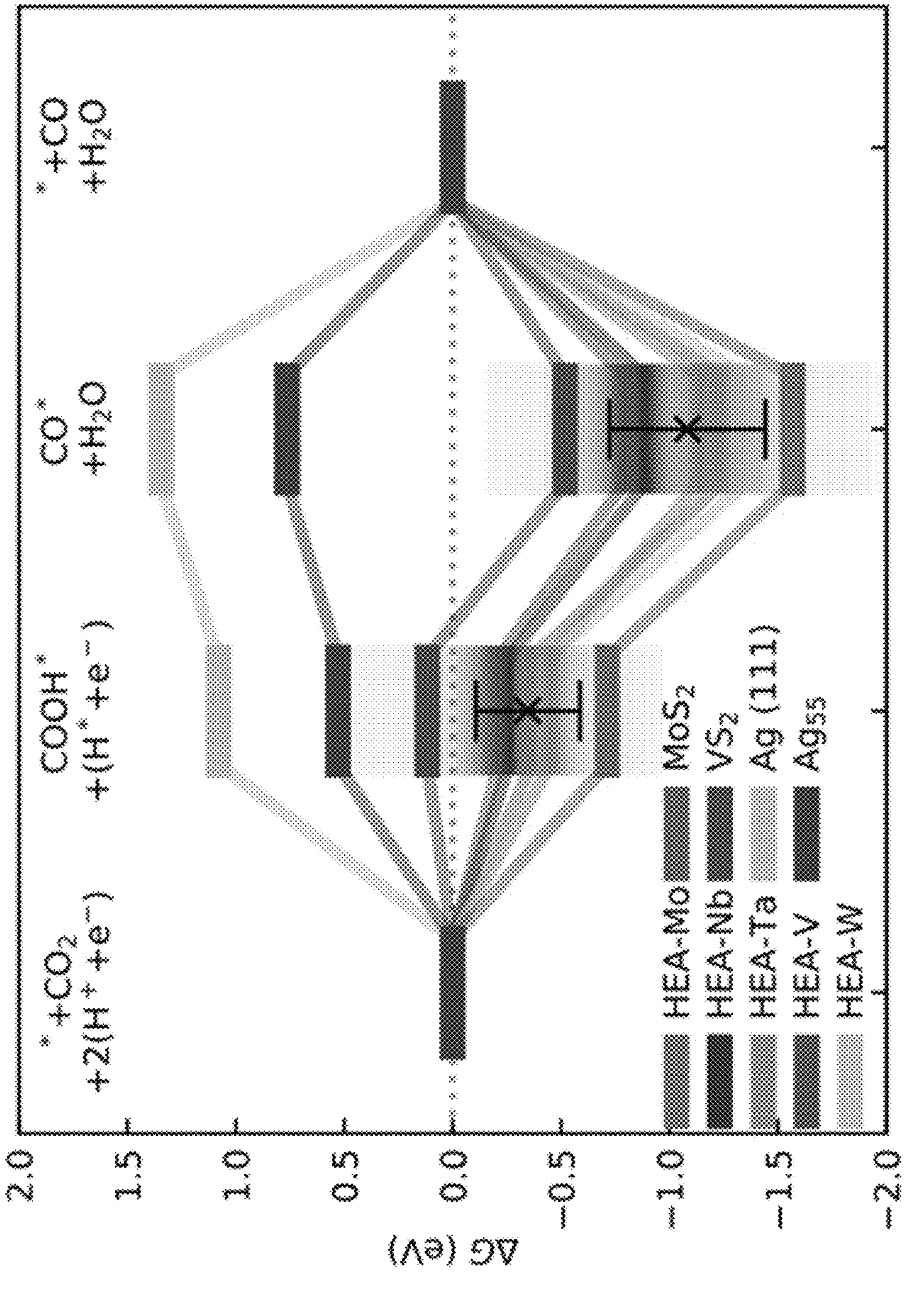
FIG. 4B is a schematic of the free energy pathway of $CO_2$ reduction at the equilibrium condition potential. The extent of the spread of each of the HEA free energy lines corresponds to $\pm 2\sigma$, and black x's with error bars correspond to averages and standard deviations taken over all configurations and sites. Unary free energies are also shown for $MoS_2$, $VS_2$, and Ag.

The free energies of the reaction steps are shown in FIG. 4B for the five different transition metal sites in (Mo,W,V, Nb,Ta). We found CO desorption to be the rate-limiting step for all studied metal sites consistent with the previous report on $WSe_2$ nanoflakes. Because of its importance, the binding energy of CO* adsorbate to different metal sites was calculated for all the four nanoribbon configurations. The free energies corresponding to COOH* and CO* absorption on (Mo,W,V,Nb,Ta) in FIG. 4B are represented by peaked distributions centered on averages over the four ribbon configurations (see FIG. 16 for free energies along the reaction pathways of each configuration individually). These distributions show how binding energies at transition metal sites vary depending on the local environment. On average, these results indicate that V and Nb sites tend to have lower CO desorption energies compared to W and Mo sites that bind strongly.

For comparison, the free energy pathways for $MoS_2$ and $VS_2$ are included in FIG. 4B, which are the two pure TMDCs having the most extreme energies for CO desorption as well as previous calculations on Ag slabs and NPs. As discussed above, different local configurations in (Mo,W,V,Nb,Ta) result in a distribution of states for binding with different reaction intermediates (COOH* and CO*). It was found that the vast majority of CO desorption energies at the varying sites of (Mo,W,V,Nb,Ta) have a smaller average value of 1.08±0.36 eV than $MoS_2$ (1.55 eV) and is, therefore, less rate-limiting (see FIGS. 17A, 17B, 17C, and 17D for adsorption energy visualization). It is noted that these desorption energies are higher than that of $VS_2$(0.5 eV). However, because COOH* adsorption is an endothermic electron transfer process on $VS_2$, it is expected to have a larger overpotential than (Mo,W,V,Nb,Ta). Similarly, Ag NP catalysts have large overpotentials due to their weak bonding to COOH*. Thus, (Mo,W,V,Nb,Ta) benefits from the disordered presence of multiple transition metal atoms that optimize the bonding strength to reduce desorption energy while keeping the overpotential minimal.

Figure 4C:
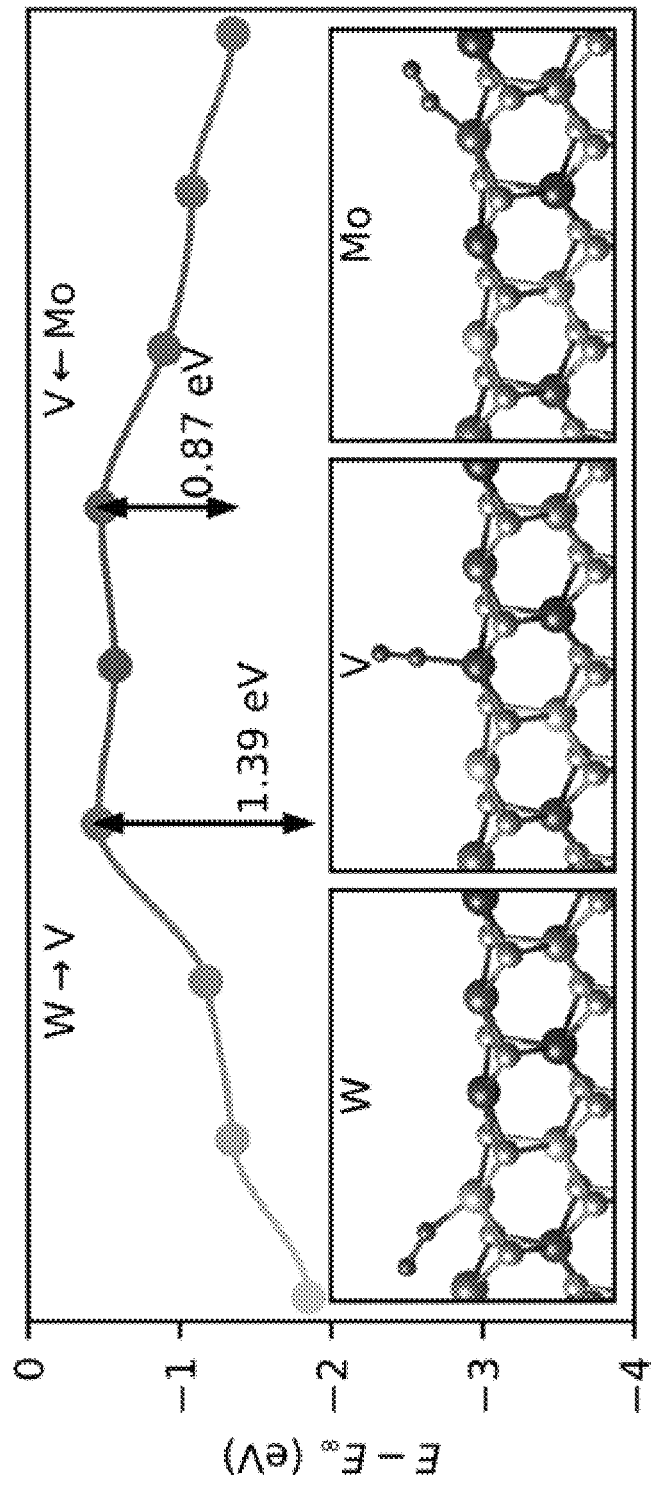
FIG. 4C is a schematic of the minimum energy pathway from nudged elastic band calculations for migration of CO from strong bonding catalyst sites (W and Mo) to a weak bonding catalysis site (V) in an example HEA configuration (Ribbon-01). The insets show visualizations of the relaxed position of the adsorbed CO on each site.

Furthermore, for those sites that have large desorption energies, it was found that it is energetically favorable for the CO* molecule to hop to a neighboring transition metal site having lower desorption energy and subsequently desorb. Climbing-image nudged elastic-band calculations were performed to determine the minimum energy pathway between sites having strong binding to CO* and neighboring sites where the binding to CO* is weaker. The results are shown in FIG. 4C for configuration Ribbon-01, where W and Mo are the two "strongest" sites and neighbor V, the "weakest" site having a desorption energy of 0.53 eV (see FIG. 16). While direct desorption of CO has associated energetic barriers of 1.85 eV and 1.40 eV for W and Mo, respectively, the barriers to reach V are relatively low at 1.39 eV from W-site and 0.87 eV from Mo-site. These results highlight that the configurational disorder facilitates multi-site catalysis and promotes higher catalytic activity by tuning the bonding strength.

In summary, a new platform was developed for materials involving 2D high entropy TMDC alloys, which were computationally predicted and subsequently verified through synthesis and characterization. The HEA with the highest configurational entropy, $(MoWVNbTa)_{0.2}S_2$, was tested for $CO_2$ electroreduction. It was shown that this catalyst exhibits extremely high activity with high selectivity towards CO production at low overpotentials. Calculations revealed that the high activity of tested HEA is attributed to the ease of CO desorption through hopping to neighboring sites with lower binding energies. Owing to these excellent properties, it is anticipated that high entropy TMDC alloys have high activity for other core electrocatalytic reactions and open a new pathway for advances in electrochemical energy systems.

Materials and Methods

Figure 5B:
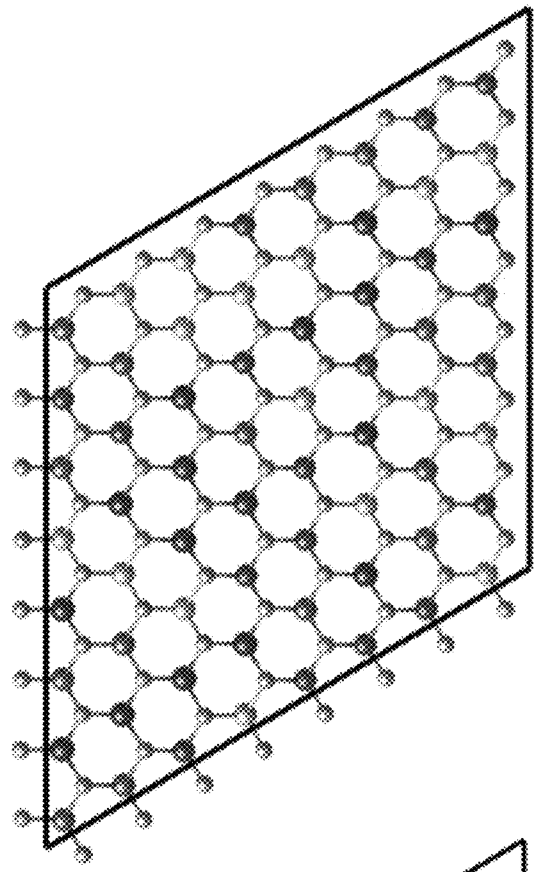
FIG. 5B is a visualization of an example SQS used to model 4-component alloys.
Figure 5A:
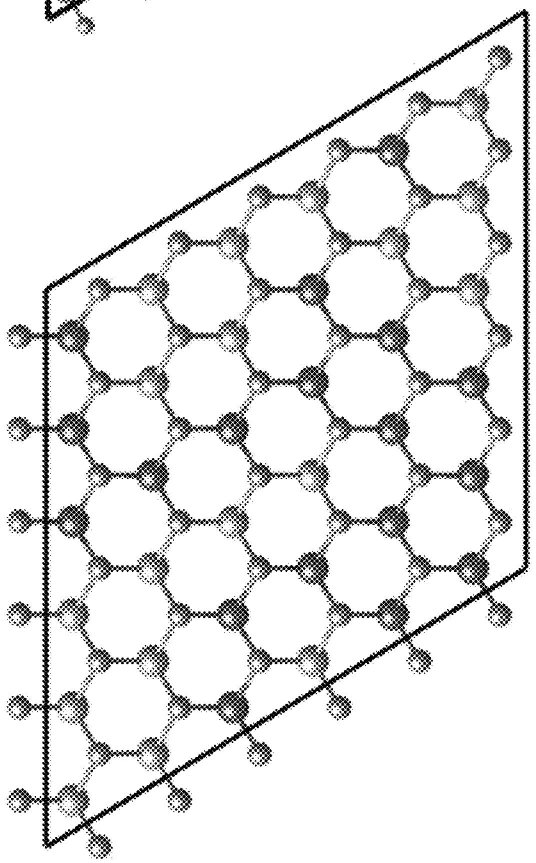
FIG. 5A is a visualization of an example SQS used to model binary alloys.
Figure 5C:
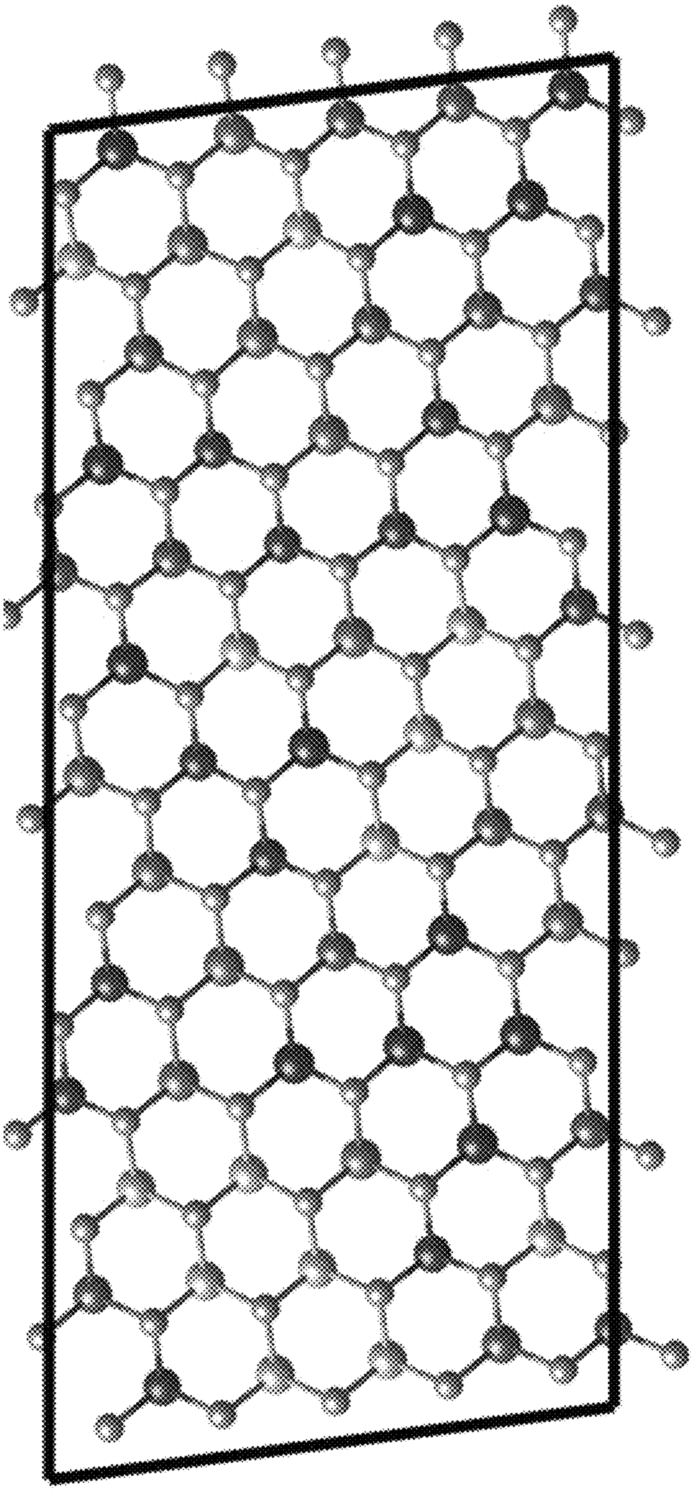
FIG. 5C is a visualization of an example SQS used to model 5-component alloys.

Computational details: Disordered alloys were simulated using special quasi-random structures (SQSs) that were generated using the Alloy Theoretic Automated Toolkit $(ATAT)_{34}$. Binary alloys, 4-component alloys, and the 5-component alloy were studied using 6×6 supercells, 8×8 supercells, and a 65 formulae unit monoclinic supercell, respectively, as shown in FIGS. 5A, 5B, and 5C, respectively. Ribbons were constructed with 5 unit cells along their periodic direction and 6 layers of transition metals along their lateral direction for a total of 30 formula units. All calculations were performed on monolayer structures with the expectation that they would generalize to bulk TMDCs due to the weak interlayer coupling. A vacuum spacing of >15 Å was used to reduce the interaction between image planes and/or ribbons due to the use of periodic boundary conditions. Total energies were calculated using DFT as implemented in VASP using the Perdew-Burke-Ernzerhof exchange-correlation functional. For the large SQSs, geometric relaxation was conducted at only the ℘-point in the reciprocal space. A subsequent static calculation for the electronic structure was performed using a 3×3×1 k-points mesh generated using the Monkhorst-Pack method. A kinetic energy cutoff of 450 eV was used for all the calculations. Additional details on the procedures used to screen the HEAs, and calculate the energy barriers for $CO_2$ reduction reaction on nanoribbons with different configuration and their passivation are provided below.

Synthesis of the high entropy TMDC alloys: Firstly, quartz tubes with inner and outer diameters of 11 and 15 cm, respectively, were etched with 2% HF solution followed by a 24-hour heat treatment at 1000° C. Thereafter, element powders were weighed and added to the tube. The sealing process of the tubes was done under $10_{-5}$ Torr vacuum pressure. Finally, tubes were placed in a single zone tube furnace and T was chosen to be ramped until it reaches $T_0$ at a rate of 1° C./min for each designated HEA. Then it was heated for 120 hours before it was left to cool down to room temperature at 1° C./min.

STEM experiments and image simulation: STEM imaging was performed using an aberration-corrected Nion UltraSTEM™ 200 microscope at Oak Ridge National Laboratory operating at 200 kV. Before imaging, the TEM grids were heated to 160° C. in vacuum for 8 hours to remove excess solvent and contamination. HAADF images were smoothed using Gaussian blurring to accurately determine the atomic positions of atomic columns. The EDS measurements shown in FIG. 2C and FIG. 2D were performed using FEI Talos F200X S/TEM microscope operating at 200 kV equipped with an extreme field emission gun (X-FEG) electron source and Super-X EDS detector system that includes four silicon-drift detectors (SDD) (Bruker XFlash 120 $mm_2$) units with a solid angle of 0.9 Steradian for chemical analysis). The EDS detectors are arranged symmetrically around the sample. The elemental hypermaps were acquired with a nominal beam current of 90 pA. STEM-HAADF simulations were performed using the multi-slice method as implemented in μSTEM. Thermal scattering was included through the phonon excitation model. The defocus value was tuned to −17 Å to obtain intensity profiles consistent with experimental data. An aberration-free probe with an accelerating voltage of 200 kV and a convergence semi-angle of 30 mrad were used. The inner and outer collection angles for the HAADF detector were set to 80 and 220 mrad, respectively.

Analytical method: Real-time analysis of the gas products from $CO_2$ reduction was done using differential electrochemical mass spectroscopy (DEMS). CO and $H_2$ gases were calibrated by detecting 1%, 5%, 10%, and 20% of both the gases with Ar in DEMS (FIG. 11). The numbers of moles (n) of CO and $H_2$ were calculated using the ideal gas law. Different percentages of the gases were purged in a fixed volume at a constant pressure which gave n of CO ($n_{CO}$) and n of $H_2$ ($n_{H2}$). These values were compared with the difference in partial pressure on DEMS.

Electrochemical reduction of $CO_2$: 1 M choline chloride ($C_5H_{14}ClNO$, Sigma-Aldrich) and 1 M potassium hydroxide (KOH, Fisher-Scientific) in aqueous media (pH≈7.40) were used as the electrolyte for electrochemical reduction of $CO_2$. The high concentration of the supporting electrolyte helped to remove migration effects. The solution was purged with $CO_2$ for 30 min until it was saturated. A two-compartment cell was used for linear sweep voltammetry (LSV) and chronoamperometry experiments. $MoWNbTaVS_2$ and Ag were exfoliated by a chemical exfoliation method. The chemical exfoliation of the electrocatalysts was done by ultrasonication in isopropyl alcohol followed by centrifugation. The exfoliated high entropy alloy, $MoWNbTaVS_2$ nanoflakes (NFs), and Ag nanoparticles (NPs) were drop cast on a gas diffusion layer (GDL). $Ag/AgNO_3$ was used as a reference electrode and Platinum wire (surface area 0.48 $cm_2$) was used as a counter electrode. Potentials were converted to RHE using: V vs RHE=V vs $Ag/AgNO_3$+0.155+0.0592*pH. The reported potentials were iR corrected. LSV experiments were performed with $MoWNbTaVS_2$NFs at a scan rate of 50 mV $s^{-1}$ and performance was compared with Ag NPs. A two-compartment cell was used when the products were analyzed for chronoamperometry experiments and LSV experiments at a scan rate of 1 mV $s^{-1}$. The pH of the solution was measured at the end of the chronoamperometry experiments.

Screening method: $T_0$ is defined as the temperature below which the free energy of the equimolar HEA is lower than the free energy of the possible "partial decompositions" (PDs). Here a partial decomposition is defined as a phase segregated mixture of pure phases ($MoS_2$, $NbS_2$, etc.) and/or equimolar binary phases ($Mo_{0.5}W_{0.5}S_2$, etc.). In general, the true ground state phase could be a mixture of single-phase disordered alloys. For instance, an equimolar AB alloy may decompose to a 50-50 mixture of $A_{0.2}B_{0.8}$ and $A_{0.8}B_{0.2}$ or into separate A and B phases. Regardless, we argue that the stability of an HEA with respect to its full and partial decompositions will indicate its ability to be synthesized in a single phase. For a general 4-component alloy (A,B,C,D), there are 10 possible partial decompositions. For a general N-component alloy, the number of total partial decompositions is given by the following sum:

$$N_{PD} = \sum_{j=0}^{\lfloor \frac{N}{2} \rfloor} \frac{1}{j!\,2^j} \frac{N!}{(N-2j)!}$$

To determine $T_0$, an expression of the Gibbs free energy as a function of temperature must be found for the equimolar HEA and all of the PDs. With reference to the full decomposition, the free energy is given by the standard equation:

$$\Delta G = \Delta H_{mix} - T\Delta S_{mix}$$

where $\Delta H_{mix}$ is the mixing enthalpy, T is the temperature in Kelvins, and $\Delta S_{mix}$ is the mixing entropy.

More specifically, the Gibbs free energy for the N-component HEA and the PDs can be written separately as:

$$\Delta H_{HEA} = E_{HEA} - \frac{1}{N}\sum_{i=1}^{N} E_i, \text{ and } \Delta H_{PD} = E_{PD} - \frac{1}{N}\sum_{i=1}^{N} E_i$$

The entropy is determined from the configurational entropy:

$$\Delta S = -k_B \sum_{i=1}^{N} x_i \ln x_i$$

In the above equation, $x_i$ denotes the molar concentration of the $i^{th}$ component. For an equimolar N-component HEA, this comes out to $\Delta S_{HEA}$=$-k_b$ ln N. For partial decompositions, $\Delta S_{PD}$ depends on the fraction of the mixture that is in a binary alloy, as expressed by:

$$\Delta S_{PD} = f_2 k_B \ln 2$$

Once the expressions for AG are found for the HEA and all of its PDs, $T_0$ is determined by finding the temperature that satisfies min(To): $\Delta G_{HEA}(T_0) \leq \Delta G_{HEA}(T_0) \forall$PD of HEA. For illustrative purposes, we also discuss a temperature $T_0$ for binary alloys. Because there is only one "partial" decomposition (to the two end members), the full decomposition, $T_0$ is simply the temperature at which the free energy of the alloy is 0 as given by the following equation:

$$T_0^{binary} = \frac{\Delta H}{k_B \ln 2}$$

Faradaic Efficiency, Turnover Number, and Energy Efficiency measurements: Faradaic Efficiency (FE) of CO and $H_2$ were calculated using the equation:

$$FE_i = \frac{nF_{n_i}}{I_t} \times 100$$

where $FE_i$ is Faradaic efficiency of i (CO or $H_2$), n is the number of electrons transferred, F is the Faraday constant, $n_i$ is the number of moles of i (CO or $H_2$) produced in time t and I is the current. $n_i$ was calculated from the integration of the number of moles obtained from DEMS results.

The turnover number (TON) is calculated using the equation:

$$TON = \frac{n_{CO}}{n_{catalyst}}$$

where $n_{catalyst}$ is the number of moles of catalyst. For measuring electroactive moles of HEA, a CV experiment was performed in $N_2$ and the current was integrated from the onset potential to −0.8 V vs RHE. The measured electroactive moles of $MoWNbTaVS_2$ from the experiment was ~$2.5\times10^{-8}$ moles $cm^{-2}$, which is ~8.3% of the total loading.

Turnover frequencies (TOFs) are calculated using the equation:

$$TOF = \frac{TON}{t}$$

Energy consumption (EC) values are calculated using the equation $$EC_{CO} = \frac{V_{cell} I}{n_{CO_{/t}}}$$

where $EC_{CO}$ is energy consumption for CO (kWh $mol_{-1}$) and $V_{cell}$ is the cell potential.

Energy efficiency was calculated using the following equation:

$$\eta = EC_{CO} = \frac{n_{CO}E_{CO} + n_{H_2}E_{H_2}}{V_{cell} I\, t} \times 100$$

where $E_{CO}$ is the energy corresponding to CO, 283.24 KJ $mol^{-1}$, and $E_{H_2}$ is the energy corresponding to $H_2$, 180 KJ $mol^{-1}$.

$CO_2$ reduction reaction pathway and free energy calculations: It is thought from previous research that $CO_2$ reduction on TMDC nanoflakes is selective to CO creation. In the presence of an electrocatalyst, a two-electron electrochemical reaction as illustrated in FIG. 4A with the following pathway occurs:

$$*+CO_2 + 2(H^+ + e^-) \longrightarrow COOH* + (H^+ + e^-) \longrightarrow CO* + H_2O \longrightarrow * + CO + H_2O$$

where * refers to the binding site.

Free energies along the catalytic reaction pathway are determined using a combination of DFT with some experimental data for gas-phase molecules and the implementation of the computational hydrogen electrode (CHE) model. The CHE model is used to determine the chemical potentials of electrons and hydrogen ions in an electrochemical reaction with an applied electric potential U:

$$\mu_{H^+} + \mu_{e^-} = \frac{1}{2}\mu_{H_2} - eU$$

where the left-hand side is the sum of the chemical potentials of the electron and hydrogen atoms and the right-hand side is half the chemical potential of gas-phase $H_2$ and a term for the applied potential. We choose U to satisfy the equilibrium condition that the free energy of the reactants and products are the same.

Free Energy is Given by the Familiar Form $$\Delta G = \Delta H - T\Delta S$$

where enthalpy is denoted by ΔH, the temperature by T, and the entropy by ΔS. In all that follows, the temperature is assumed to be 298 K. The enthalpy consists of three terms, the DFT energy, the zero-point energy, and the thermal energy as expressed by:

$$\Delta H = E_{DFT} + ZPE + \int_0^{298K} C_V dT'$$

For gas-phase molecules, $E_{DFT}$ and ZPE are calculated with DFT, and ΔS and $C_V$ are determined using the ideal gas model. For adsorbed molecules, ZPE, ΔS, and $C_V$ are determined by fixing the surface atoms of the nanoribbons and determining the contribution of the vibrational modes of the molecule calculated using DFT.

Additionally, a correction of 0.45 eV is included to account for an overestimation of the total energy of $CO_2$ by DFT. The inclusion of this correction does not affect the results of these experiments regarding energetic barriers in the rate-limiting step of CO desorption.

Figure 16:
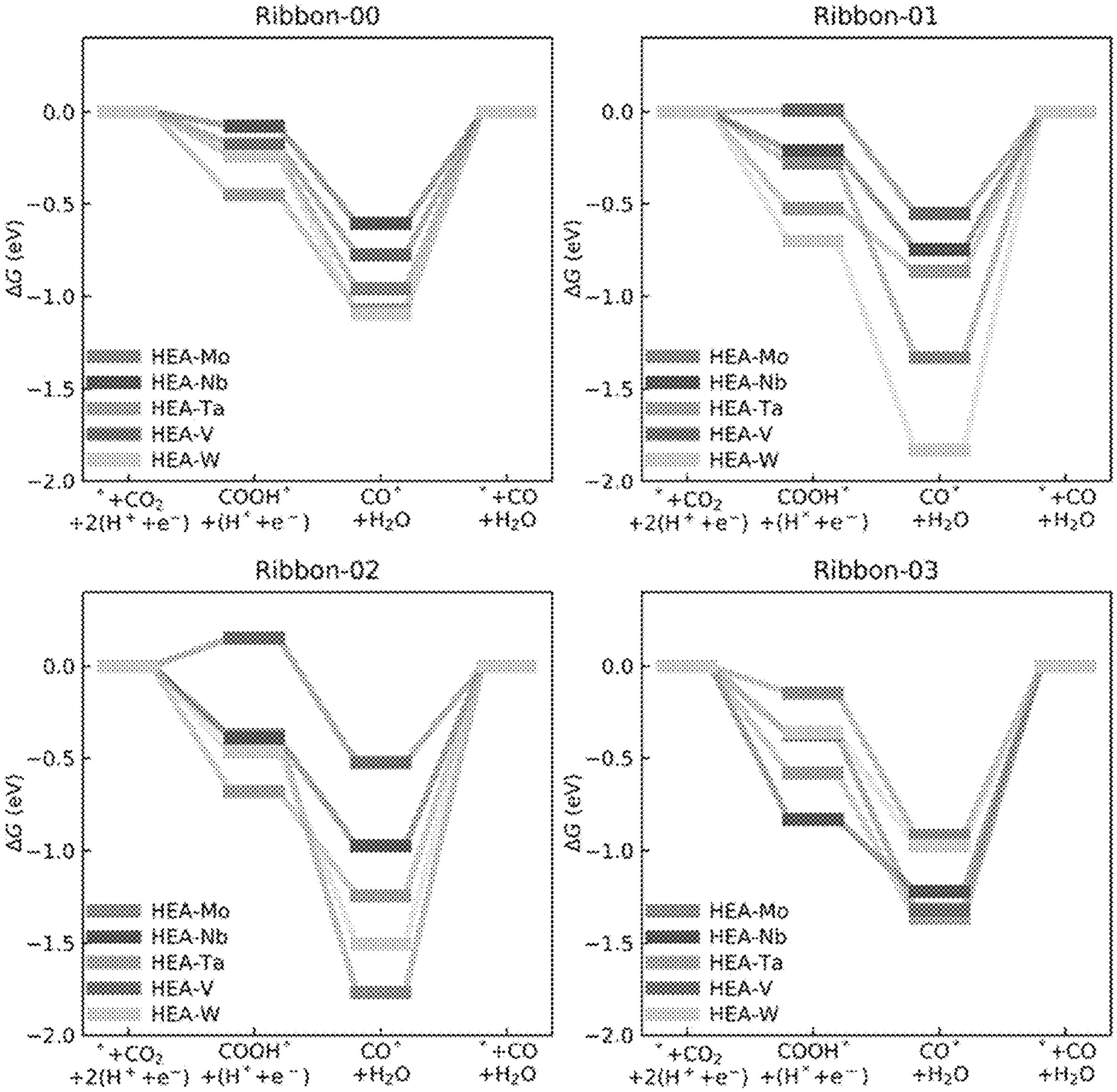
FIG. 16 is a set of schematics of the free energy pathway of $CO_2$ RR on all 5 TM edge sites of the 4 different HEA ribbon configurations. The free energy values shown in FIG. 4B are averaged over the ribbon configurations.
Figure 17A:
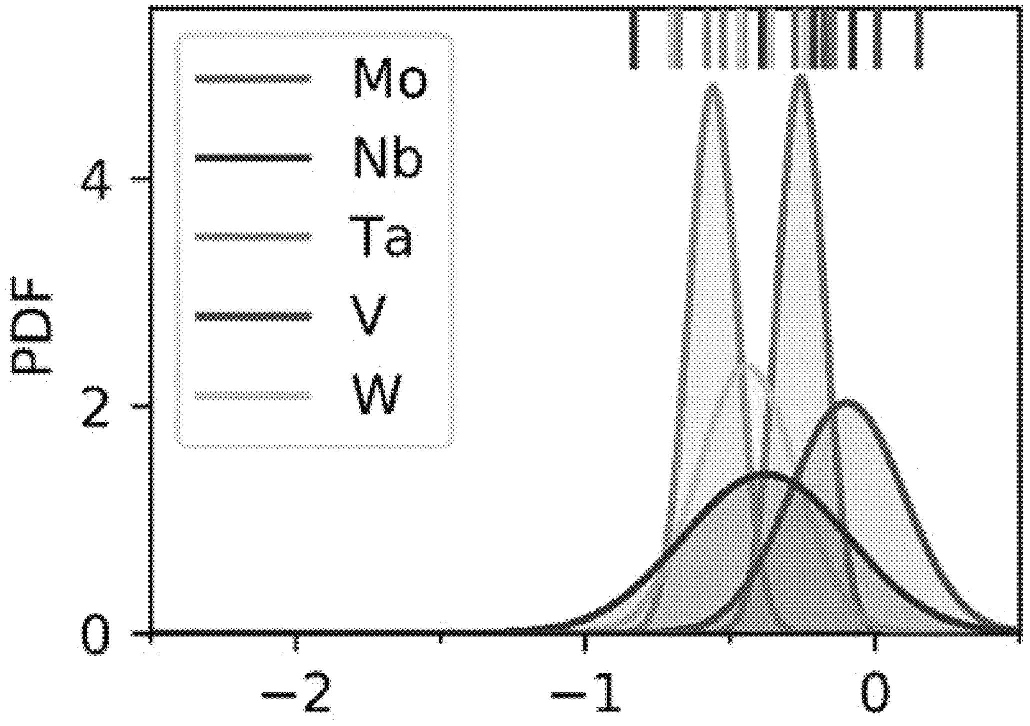
FIG. 17A is a graph of the Gaussian fits of the COOH adsorption energies of the 5 types of transition metal from four sample configurations. Individual data points are represented graphically by vertical lines at the top of the panel.
Figure 17B:
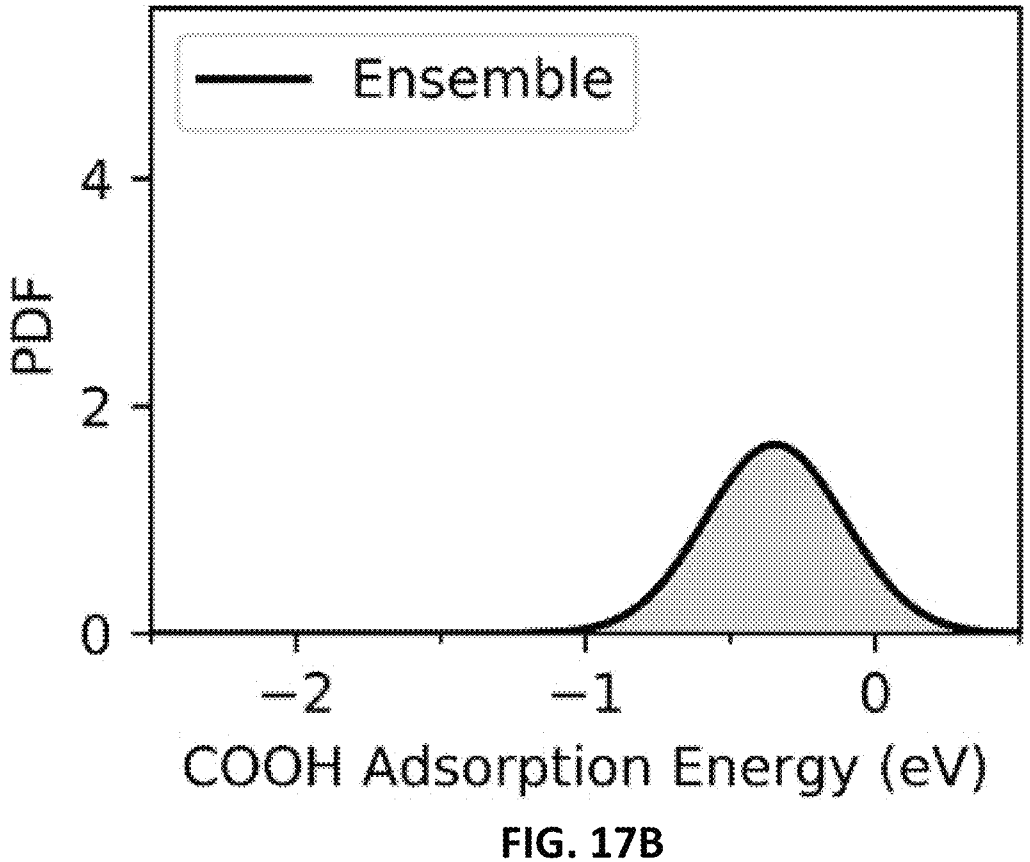
FIG. 17B is a graph of the Gaussian fit of the COOH adsorption energies of all sites and configurations reduced to a single fit.
Figure 17C:
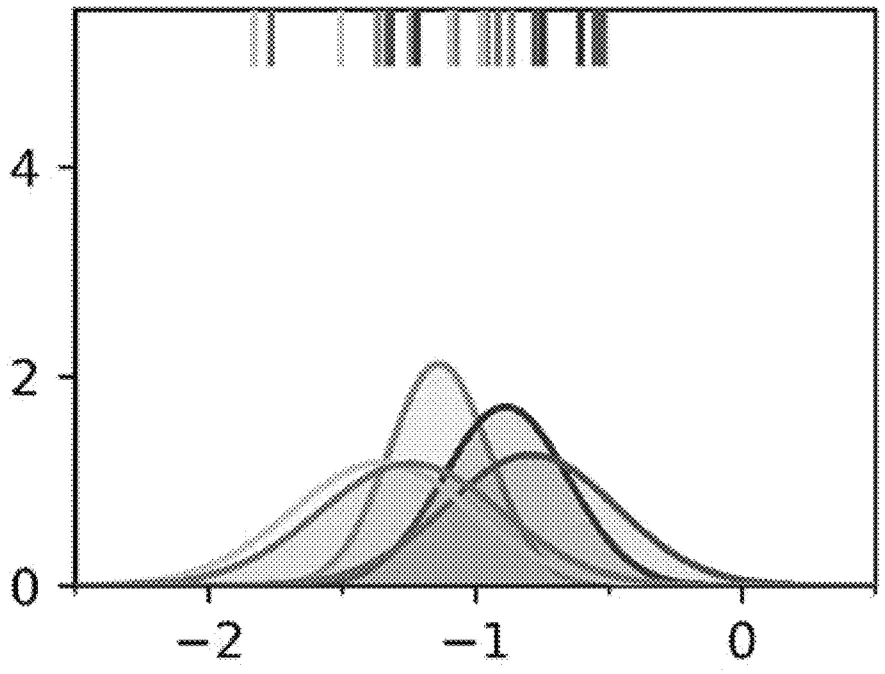
FIG. 17C is a graph of the Gaussian fits of the CO adsorption energies of the 5 types of transition metal from four sample configurations.
Figure 17D:
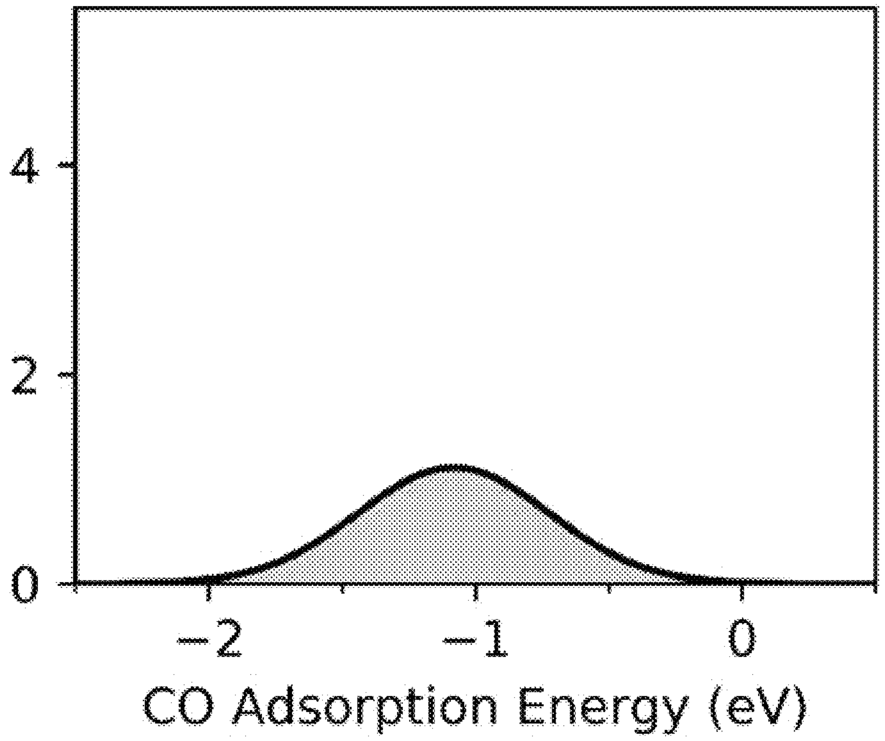
FIG. 17D is a graph of the Gaussian fit of the CO adsorption energies of all sites and configurations reduced to a single fit. For the CO adsorption energy, 90% of the distribution lies above the adsorption energy of unary $MoS_2$, −1.55 eV. Because CO desorption is the rate-limiting step, this indicates that (Mo,W,V,Nb,Ta) would make a favorable catalyst for the $CO_2$ reduction reaction.

4. HEA ribbon configurations: Simulating the properties of alloyed ribbons requires the use of SQS for the same reasons that simulating sheets of alloyed TMDCs does; ribbons, however, are especially sensitive to the selection of SQSs. Different SQSs will have different permutations of neighboring transition metal atoms at their edges. These differences in the local environment around a transition metal site may have a large effect on the adsorption energy of intermediate molecules at that site. For this reason, we used four ribbon SQSs corresponding to (Mo,W,V,Nb,Ta) with differing edge site configurations. These configurations are labeled Ribbon-00-03 and are shown in FIG. 16. These ribbons were specially chosen so that all 10 possible pairs of adjacent edge TMs are represented in two of the configurations.

Passivation of TMDC ribbons: Due to the hexagonal structure of the ribbon, shown in FIG. 16, it is not possible to generate a symmetric ribbon with two transition metal edges. This lack of mirror symmetry allows the possibility of a dipole moment. Such a dipole moment would be experimentally unphysical. An artificial dipole moment due to the asymmetric edges would lead to the separation of electrons toward the positive ions at the TM edges which could affect adsorption energies. Indeed, our DFT calculations show the strong presence of a dipole moment in these TMDC ribbons. In order to minimize this effect, we passivate the sulfur edge with 0.75 electrons using a pseudo-hydrogen atom. This charge state was shown to be most effective in reducing dipoles. Additionally, a dipole correction was used to further eliminate the presence of an electric field across the vacuum.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

What is claimed is:

1. A high-entropy alloy composition comprising at least four different transition metals from groups V and VI of the periodic table alloyed on a cation sublattice, wherein:

a. the composition comprises a two-dimensional (2D) high-entropy transition metal dichalcogenide (TMDC) comprising one of $(M^{(1)}M^{(2)}M^{(3)}M^{(4)})_{0.25}X_2$, and $(M^{(1)}M^{(2)}M^{(3)}M^{(4)}M^{(5)})_{0.20}X_2$, wherein $M^{(1)}$, $M^{(2)}$, $M^{(3)}$, $M^{(4)}$, and $M^{(5)}$ are independently selected from the group consisting of V, Nb, Ta, Mo, and W, and X is selected from the group consisting of S and Se; and b. individual elements of the at least four different transition metals and the cation sublattice are randomly distributed throughout a 3D structure of the composition.

2. The composition of claim 1, wherein the composition is miscible, the composition comprising one of $(MoWNbV)_{0.25}S_2$, $(MoWNbTa)_{0.25}S_2$, $(MoWVNbTa)_{0.20}S_2$, and $(MoVNbTa)_{0.25}S_2$.

3. A catalyst composition comprising at least four different transition metals from groups V and VI of the periodic table alloyed on a cation sublattice, wherein:

a. the composition is a two-dimensional (2D) high-entropy transition metal dichalcogenide (TMDC) comprising one of $(M^{(1)}M^{(2)}M^{(3)}M^{(4)})_{0.25}X_2$, and $(M^{(1)}M^{(2)}M^{(3)}M^{(4)}M^{(5)})_{0.20}X_2$, wherein $M^{(1)}$, $M^{(2)}$, $M^{(3)}$, $M^{(4)}$, and $M^{(5)}$ are independently selected from the group consisting of V, Nb, Ta, Mo, and W, and X is selected from the group consisting of S and Se; and b. individual elements of the at least four different transition metals and the cation sublattice are randomly distributed throughout a 3D structure of the composition.

4. The catalyst composition of claim 3, wherein the catalyst composition is miscible, the catalyst composition comprising one of $(MoWNbV)_{0.25}S_2$, $(MoWNbTa)_{0.25}S_2$, $(MoWVNbTa)_{0.20}S_2$, and $(MoVNbTa)_{0.25}S_2$.

5. The catalyst composition of claim 3, wherein the catalyst composition is configured to catalyze an electrochemical reaction, the electrochemical reaction comprising one of $CO_2$ reduction to CO, $O_2$ reduction, $H_2$ reduction, and $N_2$ reduction to $NH_3$.

6. The catalyst composition of claim 5, wherein the catalyst composition is configured to catalyze the electrochemical reaction comprising the $CO_2$ reduction to CO, wherein the catalyst composition comprises $(MoWVNbTa)_{0.20}S_2$.

* * * * *